United States Patent [19]

Beran

[11] Patent Number: 5,530,867
[45] Date of Patent: * Jun. 25, 1996

[54] SOFTWARE FOR SELF-PROGRAMMING

[76] Inventor: James T. Beran, 149 S. California Ave., #A308, Palo Alto, Calif. 94306

[*] Notice: The term of this patent shall not extend beyond the expiration date of Pat. No. 5,414,865.

[21] Appl. No.: 21,258

[22] Filed: Feb. 22, 1993

Related U.S. Application Data

[63] Continuation-in-part of Ser. No. 722,093, Jun. 27, 1991, Pat. No. 5,414,865, which is a continuation-in-part of Ser. No. 776,819, Sep. 17, 1985, abandoned, and a continuation-in-part of Ser. No. 968,338, Oct. 29, 1992, Pat. No. 5,355,509, which is a continuation of Ser. No. 850,214, Mar. 12, 1992, Pat. No. 5,161,232, which is a continuation of Ser. No. 776,819, Sep. 17, 1985, abandoned.

[51] Int. Cl.[6] .................................................. G06F 15/18
[52] U.S. Cl. .................. 395/700; 395/500; 395/800; 364/DIG. 1
[58] Field of Search .................................. 395/800, 500, 395/700; 364/148

[56] References Cited

U.S. PATENT DOCUMENTS

| | | | |
|---|---|---|---|
| 4,366,551 | 12/1982 | Holtz | 364/419.1 |
| 4,516,202 | 5/1985 | Kadowaki | 395/185.02 |
| 4,578,764 | 3/1986 | Hutchins et al. | 395/84 |
| 4,633,385 | 12/1986 | Murata et al. | 364/191 |
| 4,697,242 | 9/1987 | Holland et al. | 395/13 |
| 5,113,482 | 5/1992 | Lynne | 395/23 |
| 5,161,232 | 11/1992 | Beran | 395/800 |
| 5,214,784 | 5/1993 | Ward et al. | 395/800 |
| 5,355,509 | 10/1994 | Beran | 395/800 |
| 5,390,282 | 2/1995 | Koza et al. | 395/13 |
| 5,414,865 | 5/1995 | Beran | 385/800 |

FOREIGN PATENT DOCUMENTS

| | | | |
|---|---|---|---|
| WO93/00634 | 1/1993 | WIPO | G06F 12/00 |

OTHER PUBLICATIONS

Mark Minasi, "Improving With Time", AI Expert, Dec. 1989.

Heiserman, D. L., *How to Build Your Own Self-Programming Robot*, Blue Ridge Summit, PA, TAB Books, Inc., 1979, pp. 157–174 and 187–218.

Heiserman, D. L., *Robot Intelligence . . . with experiments*, Blue Ridge Summit, PA, TAB Books, Inc., 1981, pp. 13–24, 61–75, 140–159, and 219–290.

Heiserman, D. L., *Projects in Machine Intelligence for Your Home Computer*, Blue Ridge Summit, PA, TAB Books, Inc., 1982, pp. 1–26, 113–140, and 268–298.

*Primary Examiner*—Parshotam S. Lall
*Assistant Examiner*—Viet Vu

[57] ABSTRACT

In self-programming, an iteration uses data indicating parameters. Some parameters can be used to obtain an input value. Another parameter can be a match value that can be used with an input value to obtain control data indicating whether to perform a learning response. Another parameter could include a stack that temporarily stores a generated value from each of a number of preceding iterations in which a learning response was not performed. Another parameter could include learned values stored from the stack during a learning response. Some parameters can be numbers: a number of iterations from which generated values are stored during a learning response; a number of unsuccessful iterations after which values are generated randomly; or a number of iterations during which values are generated randomly. A parameter can indicate whether learned values are cleared before a self-programming session. Some parameters can indicate how images are presented to a user. A software product can include a storage medium with instruction data indicating instructions a processor can execute to perform self-programming. The storage medium can also have default parameter data. The processor can provide a graphical user interface allowing a user to provide or modify parameters, so that a user can experiment to obtain optimal parameters.

25 Claims, 6 Drawing Sheets

SOFTWARE FOR SELF-PROGRAMMING

This application is a continuation-in-part of U.S. patent application Ser. No. 07/722,093 filed Jun. 27, 1991, now U.S. Pat. No. 5,414,865 which is a continuation-in-part of U.S. patent application Ser. No. 07/776,819 filed Sep. 17, 1985, now abandoned. This application is also a continuation-in-part of U.S. patent application Ser. No. 07/968,338 filed Oct. 29, 1992, now U.S. Pat. No. 5,355,509 which is a continuation of U.S. patent application Ser. No. 07/850,214 filed Mar. 12, 1992, now U.S. Pat. No. 5,161,232 which is a continuation of U.S. patent application Ser. No. 06/776,819 filed Sep. 17, 1985, now abandoned.

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The invention relates to self-programming techniques.

SUMMARY OF THE INVENTION

One aspect of the invention is based on the recognition of a basic self-programming problem. A self-programming session often includes a series of iterations that have some feature in common. The feature may be a constant parameter used by all of the iterations or it may be a variable parameter whose value can be changed during one iteration, with the changed value being used in the next iteration.

This aspect of the invention is based on the recognition that this problem can be solved with an implementation of self-programming in which an iteration uses data indicating a parameter.

One type of parameter provides basic self-programming information. For example, one or more parameters could be used to obtain an input value based on results of previous iterations or on received signals; one parameter could be an array of values and another could be a position within the array that can be changed in each iteration. Another such parameter could be a value that is used with an input value to determine whether to perform a learning response; the parameter could be a match value, and a learning response could be performed when the match value and the input value are equal. Another such parameter could be a value generated in response to an input value that is not equal to the match value. The generated value could be stored temporarily, such as in a stack. If a learning response occurs soon after the value is generated, the temporarily stored generated value could be stored as a learned value.

Another type of parameter is a number that can be adjusted to change self-programming performance. For example, the parameter could be a number of preceding iterations from which generated values are stored during a learning response. Or the parameter could be a number of unsuccessful iterations after which values are generated randomly, or a number of iterations during which values are generated randomly. Or the parameter could indicate whether learned values are cleared before a session of self-programming.

Another type of parameter could indicate a feature of a user interface. For example, one such parameter could indicate a speed with which images are presented. Another such parameter could indicate how colors are presented in images.

Another aspect of the invention is based on the recognition of a problem in developing self-programming techniques. Hardware implementations are expensive and inflexible, making experimentation and optimization difficult.

This aspect of the invention is based on the discovery that this problem can be solved by a software product. The software product can be accessed by a processor, such as the processor of a personal computer, to perform self-programming in a way that permits experimentation and optimization.

This solution can be implemented by storing instruction data on a storage medium. The instruction data indicate instructions a processor can execute to perform serf-programming. In executing the instructions, the processor can use parameter data, which can also be stored on the storage medium or can be provided or modified by a user. By providing and modifying parameter data, a user can control how self-programming is performed, experimenting and optimizing as desired.

The implementation can be extended to include a graphical user interface that facilitates experimentation. The processor can be connected to receive user input signals from a user input device, such as a keyboard or mouse, and to provide image output signals defining images to an image output device such as a display. Information in an image can assist a user in providing user input signals indicating parameter data to be used in a self-programming session. The parameters can include features of the graphical user interface.

The invention is advantageous because self-programming can be performed with various parameters. Parameters can provide information used throughout a session of self-programming or can provide information from a preceding iteration to a subsequent iteration. By experimenting, a user can discover parameter values that are better for particular purposes. In addition, a user can learn general features of parameter selection and its role in self-programming.

These and other aspects, features, objects, and advantages of the invention are described below in relation to the figures.

DETAILED DESCRIPTION

A. Conceptual Framework

Figure 1:
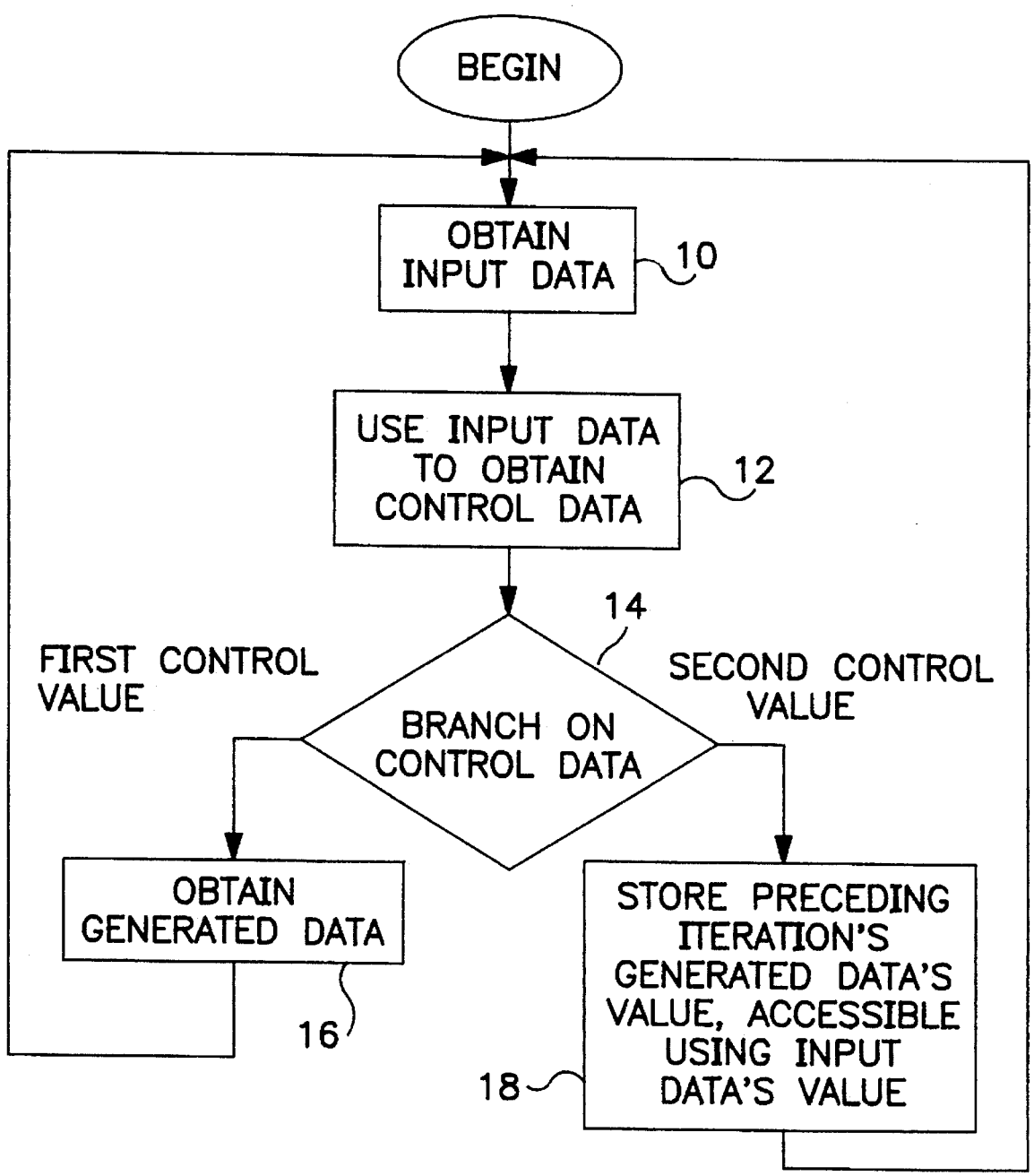
FIG. 1 is a flow chart showing general acts in serf-programming.

The following conceptual framework is helpful in understanding the broad scope of the invention, and the terms defined below have the indicated meanings throughout this application, including the claims.

The word "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as floppy disks and diskettes, optical media such as CD-ROMs, and semiconductor media such as semiconductor ROMs and RAMs. As used herein, "storage medium" covers one or more distinct units of a medium that together store a body of data. For example, a set of diskettes storing a single body of data would be a storage medium.

A "storage medium access device" is a device that includes circuitry that can access data on a data storage medium. Examples include diskette drives and CD-ROM readers.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any physical component or system that can process data, and may include one or more central processing units or other processing components.

Any two components are "connected" when there is a combination of circuitry that can transfer data from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of dam.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "dam array" or "array" is a combination of items of data that can be mapped into an array. A "two-dimensional array" is a data array whose items of data can be mapped into an array having two dimensions. A "position" within an array of values or other items of data can be indicated by indicating a position in an array into which the values or other items of data can be mapped.

An operation obtains an item of data "randomly" when it obtains the item by obtaining a number from a range of numbers in such a way that the likelihood of obtaining any number in the range is approximately the same. "Random" therefore includes both random and pseudorandom.

A "parameter" is an item of information that can be used in performing operations on data.

A "stack" is a stored item of data that can include other items of data, managed so that a sequence is maintained, with items being added or removed at an end of the sequence.

A sequence of operations on data can include "iterations," such that the iterations occur in an order within the sequence. Within the sequence, each iteration that occurs before a given iteration is a "preceding iteration," and each iteration that occurs after a given iteration is a "subsequent iteration."

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation.

An "image" is a pattern of light. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

An image "indicates" a thing, an event, or a characteristic when the image includes a feature that depends on the existence or occurrence of the thing, event, or characteristic or on a measure of the thing, event, or characteristic.

B. General Features

Figure 2:
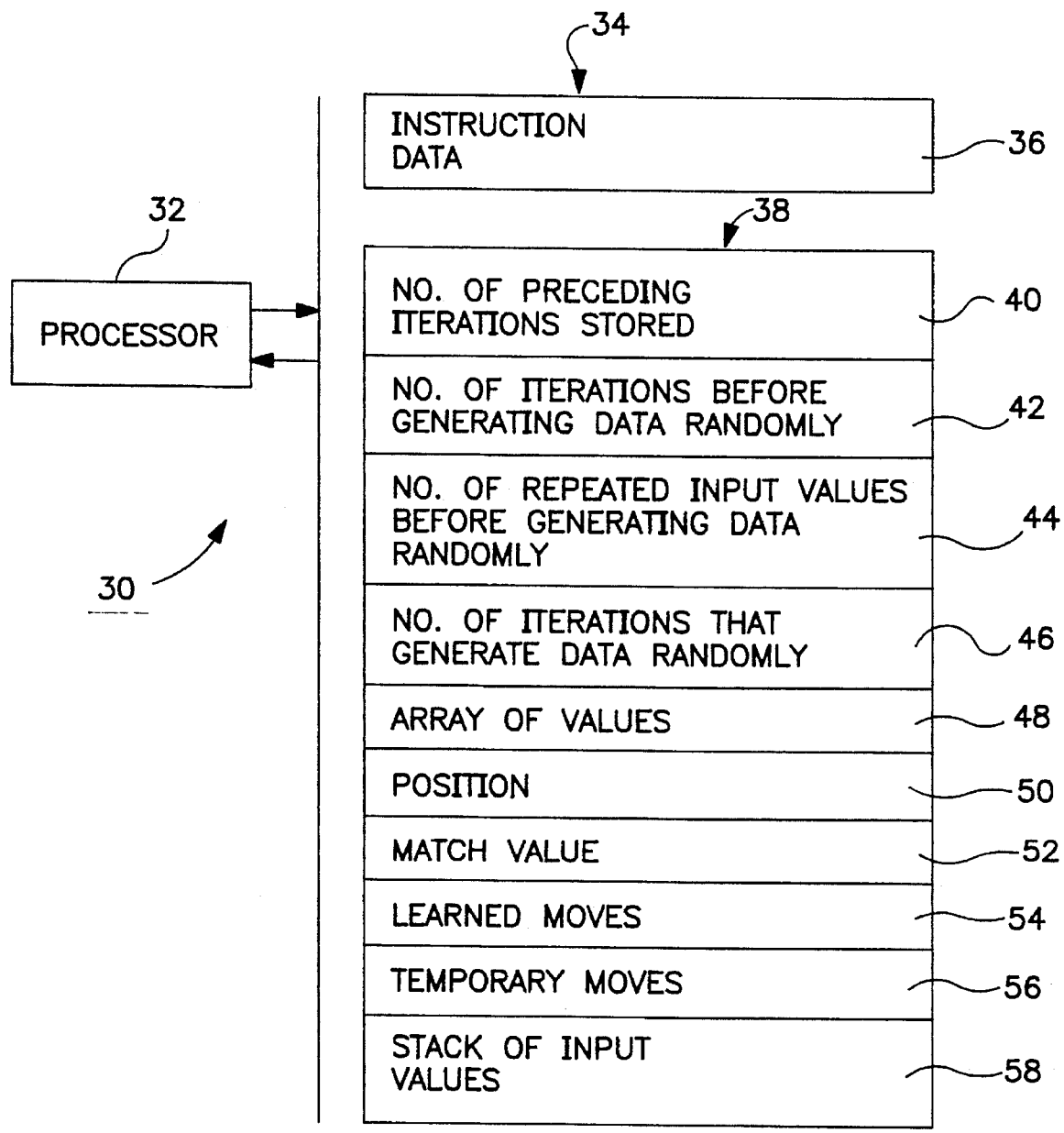
FIG. 2 is a schematic block diagram showing general components of a system that uses parameters in performing self-programming iterations.
Figure 3:
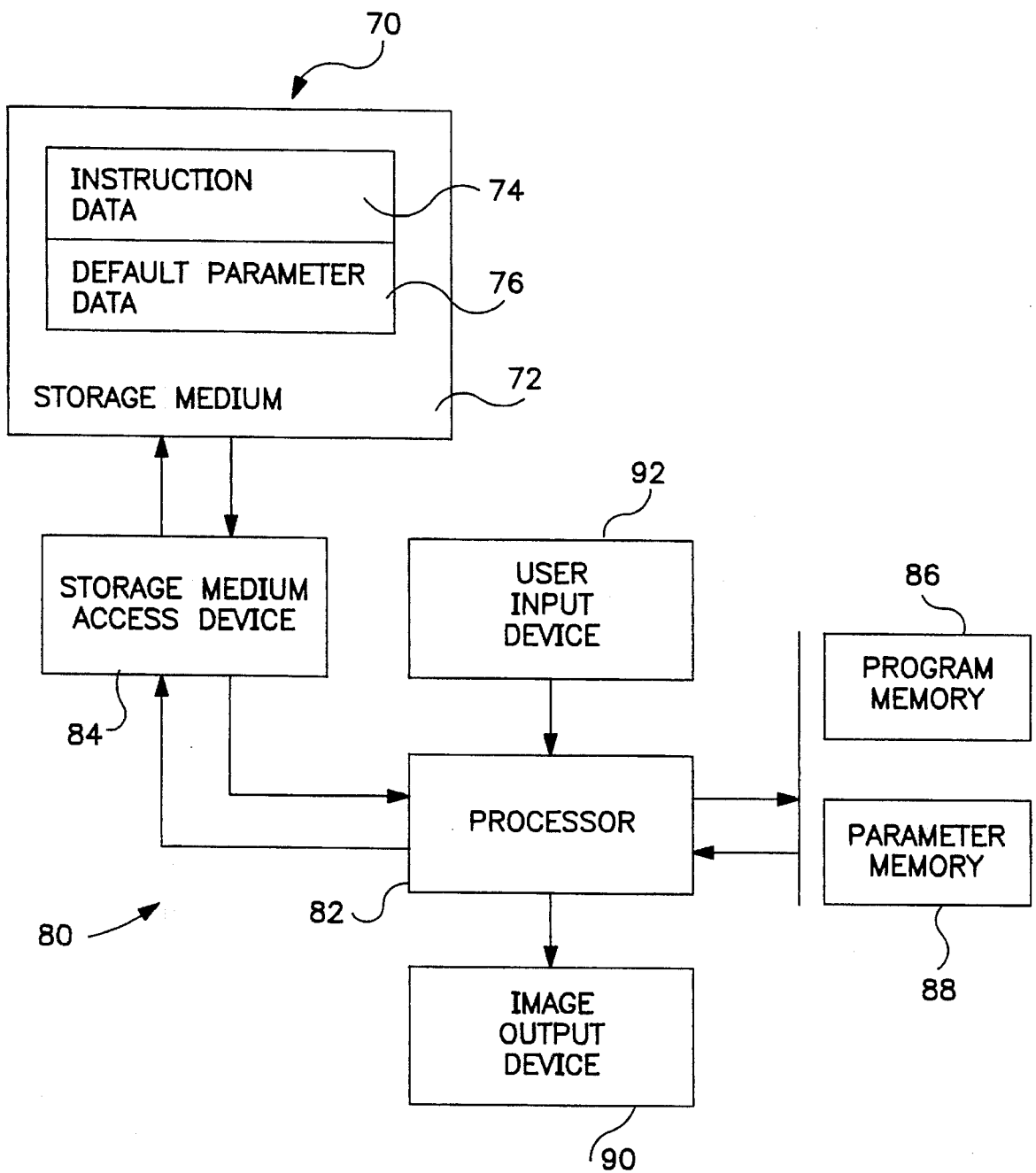
FIG. 3 is a schematic block diagram showing an article of manufacture and a machine in which it can be used to perform self-programming.

Some general features of the invention can be understood from FIGS. 1–3. FIG. 1 shows acts in self-programming. FIG. 2 shows a machine with parameter data that can be used in performing the acts in FIG. 1. FIG. 3 shows a software product with data indicating instructions that a processor can execute to perform the acts in FIG. 1.

FIG. 1 closely resembles FIG. 2 of copending U.S. patent application Ser. No. 07/772,093, entitled "Self-Programming with Limited Sequential Memory Capacity" ("the Limited Capacity Application"), incorporated herein by reference, now issued as U.S. Pat. No. 5,414,865. The acts in FIG. 1 can be performed iteratively to follow FIG. 2 of the Limited Capacity Application. Some features in FIG. 1 also appear in FIG. 5 of U.S. Pat. No. 5,161,232, entitled "Modular Self-Programmer" ("the Modular Self-Programmer Patent"), also incorporated herein by reference.

Each iteration in FIG. 1 begins by obtaining input data indicating one of a plurality of possible input values, in box 10. The act in box 12 then uses the input data to obtain control data that indicate one of a set of control values. The control values include a first control value and a second control value, and each iteration branches in box 14 depending on whether its control value has the first control value or the second.

If an iteration has the first control value, the act in box 16 obtains generated data. The generated data indicate one of a plurality of possible generated values.

If, on the other hand, an iteration has the second control value, the act in box 18 stores data indicating the value of the generated data of one or more preceding iterations. The value for a preceding iteration is stored so that it can be accessed using data having the value of the preceding iteration's input dam.

FIG. 2 shows machine 30, which can perform self-programming as in FIG. 1. Machine 30 includes processor 32, connected to access program memory 34 with instruction data 36 indicating instructions processor 32 can execute to perform the acts in FIG. 1. Processor 32 is also connected to access parameter memory 38 with parameter data indicating parameters processor 32 can use in performing acts in FIG. 1.

Parameter data 40 indicate a number of preceding iterations that are stored when the act in box 18 is performed. This parameter is also described in the Limited Capacity Application, as, for example, in relation to box 210 in FIG. 7. Processor 32 uses this parameter in an iteration with the second control value.

Parameter data 42 indicate a number of iterations before generated data is randomly obtained in box 16. Parameter data 44 similarly indicate a number of repeated input values before generated data is randomly obtained in box 16. These parameters are also described in the Limited Capacity Application, as, for example, in relation to boxes 504 and 510 in FIG. 17. Parameter data 46 indicate a number of iterations during which generated data is randomly obtained in box 16 after reaching the number indicated by parameter data 42. These parameters can be used by processor 32 in determining whether to obtain random generated dam in box 16.

Parameter data 48 indicate an array of values. Parameter data 50 indicate a position within the array. Therefore, processor 32 can use these parameters to obtain input data in box 10, by using the position to access values in the array. The accessed values can be used to obtain the input value.

Parameter data 52 indicate a match value that can be compared with the input value. An example of this parameter is the goal shown and described in relation to FIGS. 4 and 5 of the Modular Self-Programmer Patent. Processor 32 can use this parameter to obtain control data in box 12. If the match value and the input value are equal, the control data can, for example, have the second control value, while it otherwise has the first control value.

Parameter data 54 and 56 indicate, respectively, learned and temporary moves within the array indicated by parameter data 48. These data are examples of a learned store and a temporary store as described in relation to FIG. 6 of the Limited Capacity Application. As described there, parameter data 58 indicate a stack of input values. Other examples of these parameters are the output stack and the experience shown and described in relation to FIGS. 4 and 5 of the Modular Self-Programmer Patent.

Processor 32 can use parameter data 54, 56, and 58 in several ways. Processor 32 can store each input value from the act in box 10 in the stack. Processor 32 can store a generated value obtained in box 16 as a temporary move. Then, when performing the act in box 18, processor 32 can use an input value from the stack to obtain one of the temporary moves, which is then stored as a learned move. Thereafter, in the act in box 16, processor 32 can access the learned move for an input value to obtain generated data. If parameter data 54 provide a value indicating that no learned move has been stored for an input value, processor 32 can obtain a random generated value.

In general, processor 32 uses each generated value from box 16 to change the position indicated by parameter data 50. This could be done as part of the act in box 10, the act in box 16, or a separate act.

FIG. 3 shows software product 70, an article of manufacture that can be used in a machine like machine 80.

Software product 70 includes storage medium 72, which could be a magnetic medium, such as magnetic tape or disk; an optical medium, such as CD-ROM; a semiconductor medium, such as RAM or ROM; or any other machine accessible storage medium.

Software product 70 also includes instruction data 74 indicating instructions that processor 82 in machine 80 can execute in order to perform acts as in FIG. 1. Software product 70 can also include default parameter data 76 indicating default parameters that processor 82 can use in performing acts as in FIG. 1. Instruction data 74 and default parameter data 76 are stored on storage medium 72.

Machine 80 includes storage medium access device 84, which can access instruction data 74 and default parameter data 76 and provide accessed data to processor 82. Processor 82 can store data indicating instructions in program memory 86 and data indicating parameters in parameter memory 88, as in FIG. 2.

In addition to the acts in FIG. 1, instruction data 74 can indicate instructions processor 82 can execute to allow a user to provide or modify parameters. Processor 82 can provide an image output signal to image output device 90 so that image output device 90 presents an image indicating that the user can provide or modify a parameter. In response to user signals from user input device 92, processor 82 can store parameters in parameter memory 88 or modify parameters stored in parameter memory 88, then perform self-programming using the stored or modified parameters. In this way, the user can experiment and obtain optimal parameters for a particular purpose.

User input device 92 can be a keyboard, a mouse, a joystick, a track ball, a data glove, or any other user input device that can provide signals based on user actions to processor 82. Image output device 90 can be a display, such as a CRT or LCD display, or any other image output device that can present an image in response to image output signals from processor 82.

C. Implementations

The invention could be implemented in numerous ways using a wide variety of hardware and software components. The invention has currently been implemented in the C programming language using Turbo C++, a product of Borland International, Inc., on a MiTAC 3026E notebook computer, a product of MITAC International Corporation.

Figure 4:
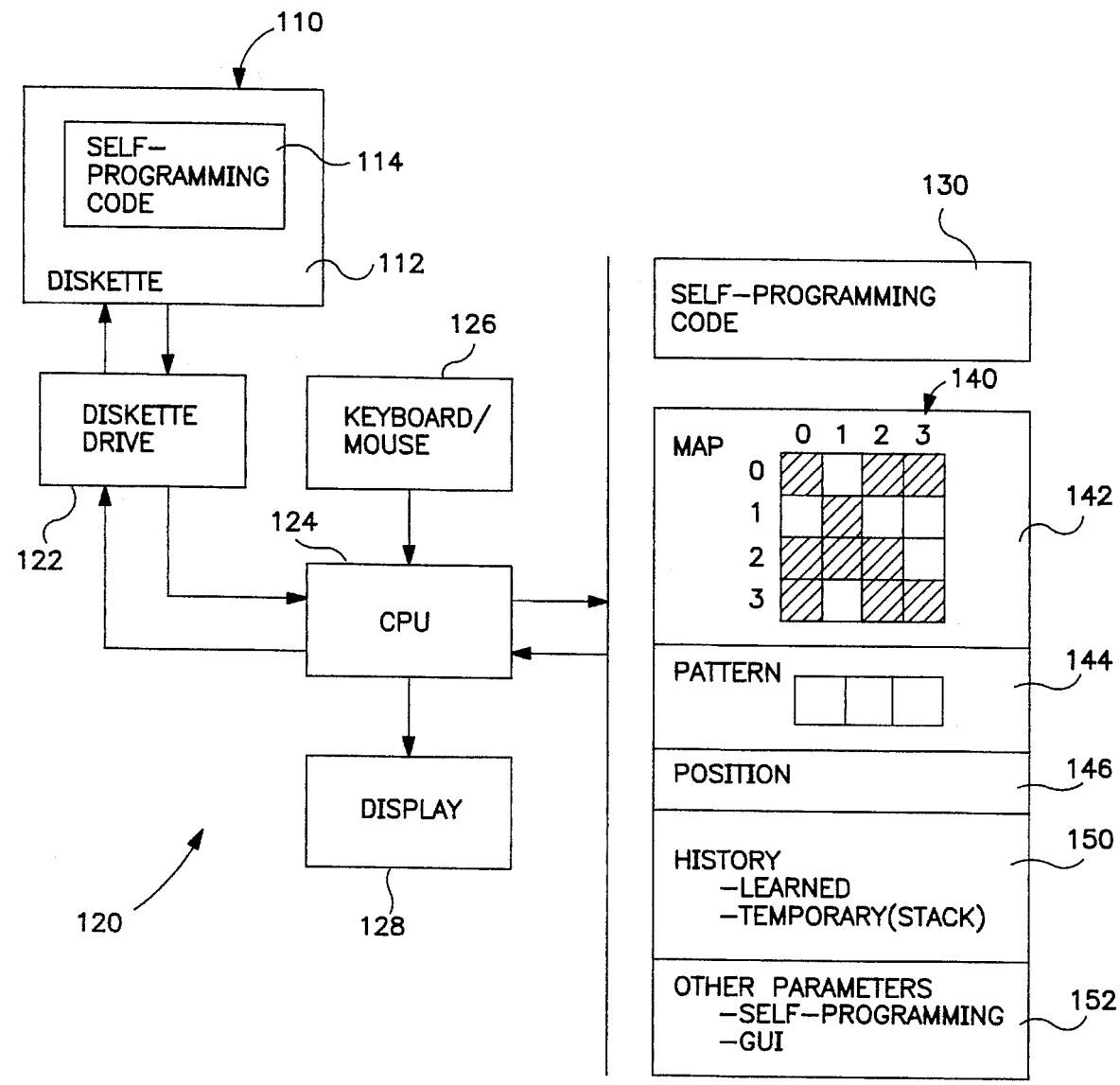
FIG. 4 is a schematic block diagram showing components of an implementation in which self-programming code on a floppy disk indicates instructions a central processing unit (CPU) can execute to perform self-programming.
Figure 5:
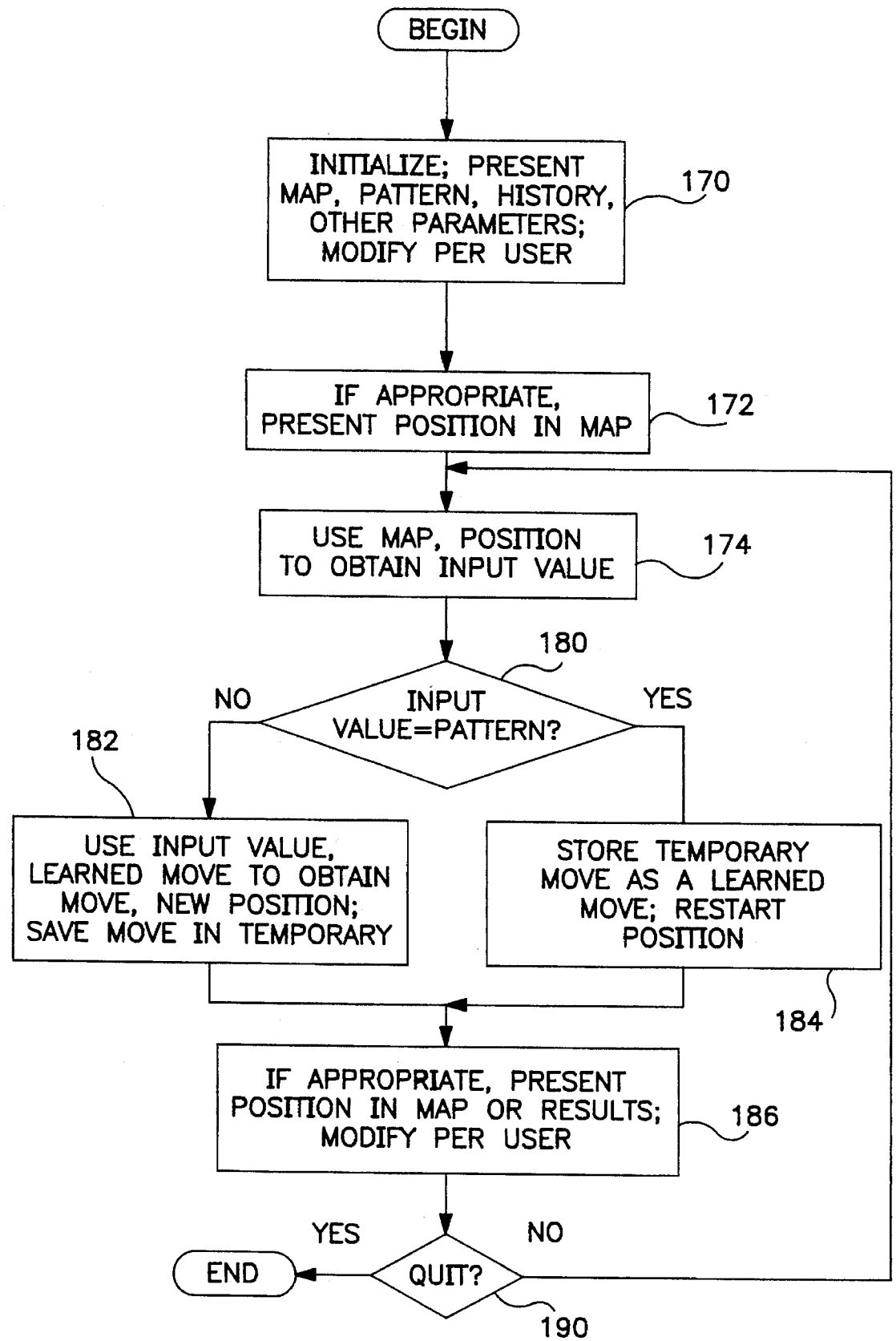
FIG. 5 is a flow chart showing general acts performed by a CPU in executing instructions indicated by self-programming code.
Figure 6:
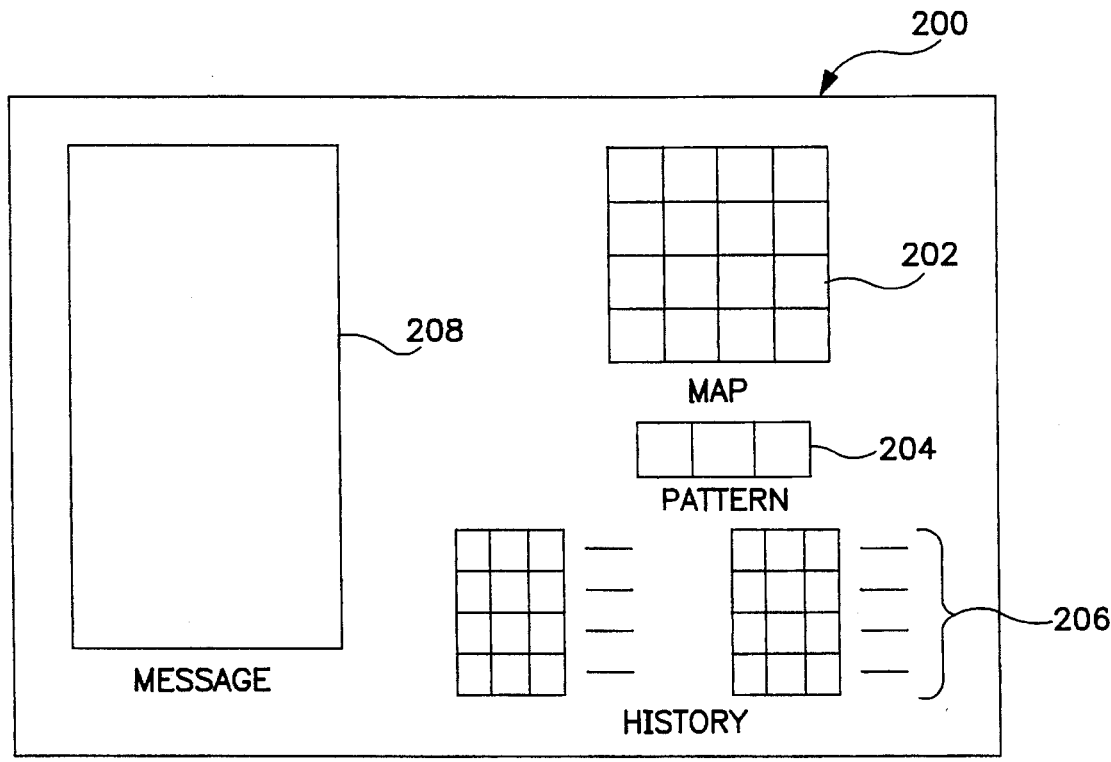
FIG. 6 is a schematic diagram showing features of an image presented on a display in response to signals from a CPU.

FIGS. 4-6 illustrate features of current implementations. FIG. 4 shows a software product and components of a machine in which it can be used. FIG. 5 shows acts performed by a machine's processor in executing instructions indicated by code from the software product. FIG. 6 shows features of an image presented when the processor executes the instructions.

Software product 110 in FIG. 4 includes diskette 112 on which self-programming code 114 is stored. Appendix A is an example of how self-programming code 114 has been implemented in one current implementation. The code in Appendix A is heavily commented and is relatively serf-explanatory. Although the code in Appendix A may differ from FIGS. 4-6 in various ways, it generally includes the same or equivalent features when copied and executed on a MITAC 3026E notebook computer running Turbo C++. Self-programming code 114 could instead be a machine-executable file.

Machine 120 in FIG. 4 includes diskette drive 122 which can access self-programming code 114 when software product 110 is used in machine 120. Central processing unit (CPU) 124 receives user signals from keyboard and mouse 126 and provides output image signals to display 128. In response to user signals, CPU 124 can copy self-programming code 114 into its memory as a source code file or as a machine-executable file, illustratively shown in program memory 130. If a source code file, program memory 130 can also include a compiler that CPU 124 can execute to produce a machine-executable file.

When CPU 124 executes the machine-executable file, it obtains a number of items of data, illustratively shown in data memory 140. In a conventional personal computer or workstation, program memory 130 and data memory 140 need not be separate memory devices, but need only be respective parts of memory that CPU 124 can access to obtain data indicating instructions or items of data indicating parameters, as illustrated.

In data memory 140, map 142 indicates values for an array as illustrated. Map 142 can include values, each defining one location in the array. The locations could form any appropriate geometric shape. Map 142 is shown with 16 locations that form a 4×4 square, treated as wrapping around in both vertical and horizontal directions. FIG. 4 shows default values for the squares.

Pattern 144 indicates values for a small set of locations. Pattern 144 can include a set of values or one value that indicates the set of values. The small set of locations can form any appropriate shape that occurs in the array indicated by map 142. Pattern 144 is shown with three locations in a line. FIG. 4 shows the default set of values (0, 0, 0) for pattern 144. This set occurs in two positions in the array indicated by map 142, one extending leftward from the square in column 0, row 1, the other extending rightward from the square in column 2, row 1.

Position 146 indicates a position in the array indicated by map 142 at which pattern 144 is compared with values in the array. Position 146 can, for example, indicate a row and column for the center value in pattern 144 and an orientation. The positions described above at which the default values for pattern 144 match the default values in map 142 could be indicated as column 3, row 1, with two horizontal orientations, right-to-left and left-to-right. Position 146 can be randomly initialized to choose a starting position.

History 150 includes two parts. One part indicates learned values and the other part indicates temporary values that can be stored as learned values during a learning response. Each value, whether learned or temporary, can indicate a move that can be made from a current position to a new position. CPU 124 can use position 146 to obtain a three bit value from map 142, and this three bit value can be used to access a learned move in history 150. History 150 can hold a learned move for each of the eight possible three bit values. Each learned move can, for example, be one of four available moves—shift one position forward; shift one position backward; rotate 90 degrees clockwise; or rotate 90 degrees counterclockwise.

Temporary moves could be stored in more than one way within history 150. For example, one temporary move could be stored for each of the eight possible three bit input values, as described above for the learned moves, and actual three bit values received could be stored in a stack for use in accessing temporary moves in a learning response, as in Appendix A. Or each three bit input value and a move generated in response could be stored in a pair in a stack. In any case, when the values indicated by pattern 144 are matched at position 146 in the array indicated by map 142, a sequence of temporary moves that led to the match can be stored as learned moves, as described in the Limited Capacity Application.

Data 140 can include other parameters 152, including self-programming parameters like those in FIG. 2 and also including parameters of a graphical user interface ("GUI"). Additional examples of both types of parameters appear in Appendix A. Of particular interest are the self-programming parameters Maxnomatch and Maxrandommoves in Appendix A. Maxnomatch indicates the number of moves in a serf-programming session before each iteration begins to generate a move randomly, and Maxrandommoves indicates the number of moves that are then generated randomly. Experimentation indicates that a single random move is not enough for optimal learning; it is better to generate a series of moves randomly until either pattern 144 is matched or a larger maximum number of moves is reached; the maximum number of moves, equal to the sum of Maxnomatch and Maxrandommoves, can be chosen based on empirical results.

CPU 124 can begin the acts in box 170 in FIG. 5 by initializing parameters to default values. The default values for map 142 and pattern 144 can be presented on display 128, together with any other parameters the user can modify and a cleared version of history 150. In response to signals from keyboard and mouse 126, CPU 124 can modify the parameters, as shown in box 170.

Before beginning a session with the current parameters, CPU 124 can cause presentation of position 146 in map 142, in box 172, which occurs in Mode A in Appendix A. In each self-programming iteration, CPU 124 uses map 142 and position 146 to obtain an input value, which can indicate the values of three locations at the current position, in box 174. Then, box 180 branches based on whether the input value matches pattern 144; in other words, if the result of a comparison is a control value indicating no match, the acts in box 182 are performed, but if the result is a control value indicating a match, the acts in box 184 are performed.

The acts in box 182 include using the input value from box 174 and a learned move in history 150 that can be accessed with the input value to obtain a move to a new position. If history 150 does not have a valid learned move, and in other situations described in the Limited Capacity Application and in Appendix A, a random move can be generated rather than a learned move. In any case, the move that is generated is stored as a temporary move in history 150 in box 182.

The acts in box 184 include storing at least one temporary move as a learned move in history 150. A limited length sequence of temporary moves can be stored as learned moves as described in the Limited Capacity Application and in Appendix A. Then, in preparation to start again, a new value for position 146 can be obtained, such as by randomly obtaining a new position.

After box 182 or 184, the acts in box 186 can, if appropriate, again present map 142 showing the current position indicated by position 146 using display 128. In response to user signals, parameters can be modified before beginning another iteration.

The act in box 190 determines whether the user signals indicate a request to quit self-programming. If so, self-programming ends, but if not, self-programming can continue with another iteration, beginning with box 174.

FIG. 6 shows some features of image 200 presented by display 128 during execution of machine-executable code obtained by compiling the source code in Appendix A.

Image 200 includes viewport 202 in which the array indicated by map 142 can be presented, with or without showing the current position indicated by position 146. To allow a user to edit the array, each square in viewport 202 can be presented with a character inside it; when the user enters a square's character, the square is toggled from one binary value to the other.

Viewport 204 can present values for a small set of locations as indicated by pattern 144. To allow editing, each square in viewport 204 can also be presented with a character inside it that a user can enter to toggle the square's value.

Learned moves in history 150 can be presented in viewport 206. Each possible three bit input value can be shown graphically, followed by an abbreviation indicating its current learned move.

Viewport 208 can be used to present text including explanation, choices a user can select, and results of self-programming. To permit editing of other parameters besides those shown in other viewports, the current value of a parameter to be edited can be shown in viewport 208 together with a character that a user can enter to change the parameter's value.

Figure 7:
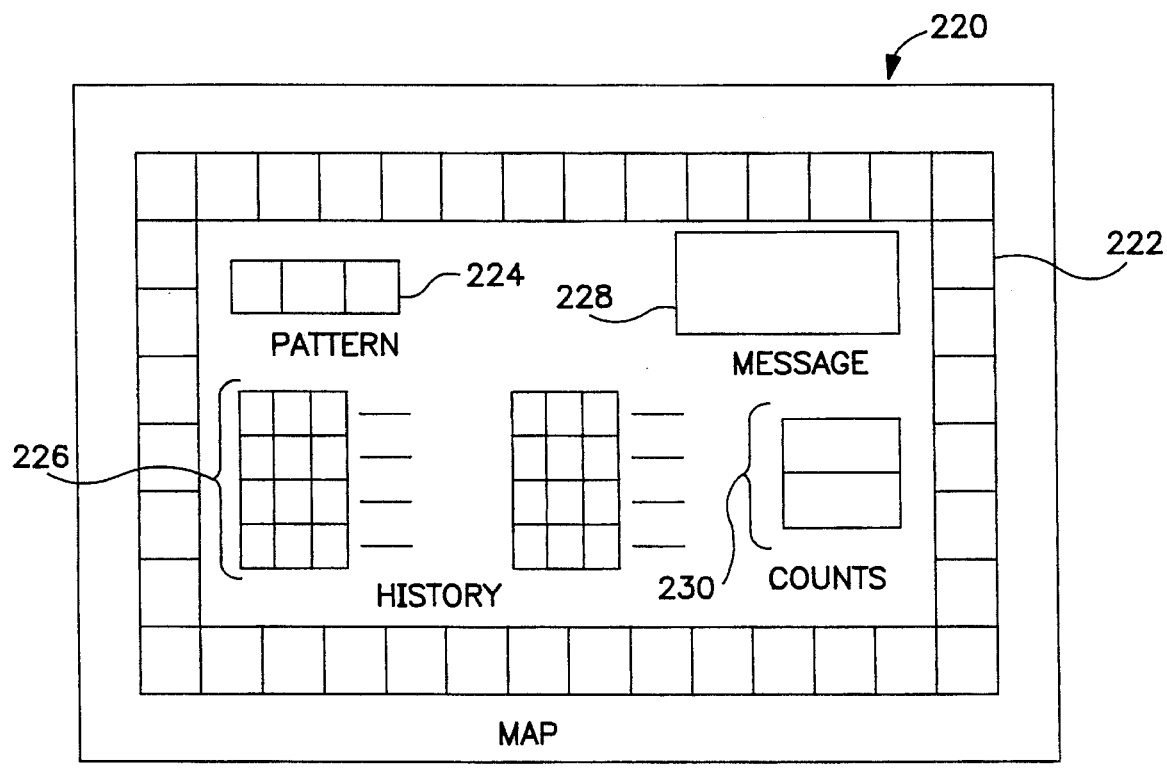
FIG. 7 is a schematic diagram showing features of another image that could be presented on a display in response to signals from a CPU.

FIG. 7 shows image 220, another possible presentation.

The array indicated by map 142 can be a one-dimensional array whose ends are treated as connected, so that viewport 222 can show values in the array as a closed rectangle around the outer border of image 220. Other viewports can be positioned within viewport 222.

Viewport 224 provides the same type of information as viewport 204 in FIG. 6. Learned moves could be presented in viewports 226, but with a different set of moves than those described above in order to permit movement within the array; the moves could resemble worm-like moves. Viewport 228 provides the same types of information as viewport 208 in FIG. 6.

To provide further feedback to a user, useful counts can be presented in viewports 230. For example, a count of the number of moves in the current search could be presented. Also, a count of the number of searches with the current parameters could be presented. Also, a count of random moves in this search could be presented.

During development of the implementation in Appendix A, several discoveries have been made about specific combinations of parameters.

The default values described above for map 142 and pattern 144 provide a very interesting illustration of how learning occurs during self-programming. At first, there are no learned moves, so that every move is randomly generated. Then, a few successes result in a set of learned moves. These initial learned moves typically result in average performance that is worse than with random moves because the learned moves interact to prevent success from certain starting positions; frequently, the initial learned moves cause repetitive unsuccessful movements. Eventually, often after thousands of searches, a set of moves is learned that reliably leads to success from every possible starting position in less than Maxnomatch moves.

Maxnomatch can be reduced to find an optimal set of learned moves, but if Mariomatch is too small, a stable set of learned moves cannot be obtained, because some starting position then requires more than Maxnomatch moves to reach success, so that random moves must be generated, leading to further learning.

Another interesting map has the values (0, 0, 0, 1) in row 0; (0, 1, 1, 0) in row 1; (1, 0, 1, 0) in row 2; and (1, 0, 1, 0)

in row 3. Although the pattern (1, 1, 1) occurs in column 2 of this map, a stable set of learned moves to find this pattern has not been obtained for values of Maxnomatch that have been tried.

Similarly, in a map with (1, 1, 1, 0) in row 0; (1, 1, 0, 0) in row 1; (1, 0, 0, 1) in row 2; and (0, 1, 0, 1) in row 3, the pattern (0, 0, 0) occurs in column 2 but a stable set of learned moves to find this pattern has not been obtained for values of Maxnomatch that have been tried.

The reason for failure to find stable sets of learned moves in these cases is unclear. Perhaps two starting positions that have the same values interact—if a set of learned moves is obtained that allows success from one of the starting positions, success cannot be obtained from the other starting position, and vice versa.

In contrast, with the values (1, 1, 0, 0) in row 0; (0, 0, 1, 1) in row 1; (0, 0, 1, 1) in row 2; and (1, 0, 1, 0) in row 3, a stable set of learned values can be obtained for either of the patterns (1, 1, 1) and (0, 0, 0), even with Maxnomatch reduced as low as 12.

Stable sets of learned moves for other, more frequently occurring patterns can typically be obtained for most maps with very low values of Maxnomatch, sometimes as low as 2 or 3. Often, a stable set of learned moves that works with one map and pattern will also work for another, suggesting that there may be a mathematical technique for obtaining a stable set of learned moves without actually performing self-programming, although no such mathematical technique has been discovered.

A stable set of learned moves can be viewed as a very simple machine original work (MOW). Due to the trial-and-error nature of self-programming, the set of learned moves produced by a session of self-programming cannot be predicted, so that the self-programming session is original in the sense that it creates new information not previously available. It may be possible to extend self-programming to produce more complex MOWs.

D. Applications

Self programming techniques in accordance with the invention could be used in a number of applications. For example, an educational software product or a video game product could be marketed using self-programming according to the invention.

In addition, self-programming techniques according to the invention could be included in a software product used to design a system or network that includes self-programming modules. Each module in the system could be simulated to determine optimal parameters for its operation.

E. Miscellaneous

The invention could be implemented in many other ways in addition to the implementations described above.

The invention has been described primarily in relation to software implementations, but the invention could also be implemented in hardware.

The invention has been described in relation to an implementation in the C programming language and a MITAC notebook computer. The invention could be implemented in any other programming language and with any machine capable of executing software written in any such language, including any commercially available computer.

The invention has been described in relation to an implementation in which default parameters and instructions are both included in a single file of source code. The invention could be implemented in numerous other ways, such as with separate files for default parameters or with plural files of instructions. For example, one file of instructions could include routines that are common to a number of implementations and each implementation could then have a file for its unique instructions. Also, a useful set of parameters, once obtained, could be stored in a file for subsequent reuse.

The implementation in Appendix A is based on simple programming techniques available to a novice programmer, and could be made much more elegant and efficient by applying more sophisticated programming techniques.

The invention has been described in relation to an implementation that allows a user to experiment with parameters. This implementation could be modified to provide a game in which a user can change one or more parameters to obtain a result. For example, a teaser screen could be added to attract a user's interest. A user's performance could be evaluated on a task, such as a task to find a map and pattern that stumps the self-programmer. If the current position is presented as a worm, a game could involve catching, trapping, or evading the worm. Also, maps and patterns could be randomly generated and the user's performance in obtaining a stable set of learned moves could be evaluated.

The invention has been described in relation to certain features of images that permit a user to edit parameters. Numerous other ways of permitting editing could be used in the invention. For example, parameters could be presented in a manner that permits direct text editing of parameters.

The invention has been described in relation to certain features of images that provide feedback to a user. Numerous other feedback techniques could be used, including audio feedback.

In general, the images described above could be modified in numerous ways. For example, the current parameters could be presented at all times during a search. Also, the viewports shown could be reshaped, repositioned, divided, or combined in any appropriate way. Characters could be sized differently and could be presented in other fonts. Rather than a graphical user interface, a TTY type display interface could be used.

The invention has been described in relation to techniques in which a user enters a character to perform editing of parameters. A mouse could be used to facilitate editing and other user signals. A mouse menu could be provided that includes options that would otherwise be presented to the user in a viewport. A set of maps could be saved and presented in a manner that permits a user to select a map for use in self-programming.

The invention has been described in relation to an implementation in which a user can edit certain parameters. The user could edit other parameters. For example, the rate at which images are updated during a search could be edited to provide a smoother interface; the colors for display could be edited to improve viewing on a color display; the history could be edited to experiment with sets of learned moves, and additional information might usefully be stored in the history.

The invention has been described in relation to techniques in which input values are obtained using an array within which a position can be moved. Various other techniques for obtaining input values could be used, including sensors that could be controlled such as by modifying position, orientation, state, or sensitivity. The arrays of the implementations described above are continuous in the sense that none of the moves can take the position to an edge of an array, but techniques could be used to provide inputs indicating an edge of an array beyond which a move cannot be made. Also, the arrays described above are one- and two-dimensional, but n-dimensional arrays could be used. Further, a virtual array could be used, only part of which is presented on the display at a time. In the techniques described above, the pattern sought in an array is typically three consecutive positions, but larger or smaller patterns could be sought. Also, patterns of other shapes could be sought. Further, searches could be concurrently performed, each with a different current position, analogous to more than one worm in the array.

Although the invention has been described in relation to various implementations, together with modifications, variations, and extensions thereof, other implementations, modifications, and extensions are within the scope of the invention. The invention is therefore not limited by the description contained herein or by the drawings, but only by the claims.

```
/* fndrcde.c */                    APPENDIX A

/* Copyright (c) James T. Beran 1992, 1993.  All Rights Reserved. */

/* fndrcde.c has a graphical user */
/* interface in which a user can change map, */
/* pattern, and other parameters. */ include <graphics.h>
include <stdio.h>
#include <math.h>
#include <stdlib.h>
#include <time.h>

/* Files */

/* Function Prototypes */ int doinitgraph(void);
void titlescreen(void);
void legalscreen(void);
void introscreen(void);
int guiscreen(void);
void starttext(void);
int guiintro(void);
void startgui(void);
void dogame(void);
void dosearch(void);
void editmaporpattern(void);
void editmodeorparameters(void);
void showmapwithchars(void);
void showpatternwithchars(void);
void showdefaultparameters(void);
void shiftmode(void);
void shiftsessionmax(void);
void shiftmaxnomatch(void);
void incrementmaxnomatch(void);
void decrementmaxnomatch(void);
void shiftrandommoves(void);
void incrementrandommoves(void);
void decrementrandommoves(void);
void shifttabularasa(void);
void shiftlearninglength(void);
void learnforgame(void);
void dolearn(void);
void showgui(void);
void showhistorysquares(void);
void showmove(void);
void showtitlebar(void);
void showblankmap(void);
int intromap(void);
void showdemomap(void);
void intropattern(void);
void introhistory(void);
void showoptions(void);
void showintroexit(void);
void shownewmap(void);
void shownewpattern(void);
void shownewhistory(void);
void showgameintro(void);
void showsearchintro(void);
void showstartingposition(void);
void showsearchresults(void);
void getranno(void);
void startposition(void);
void getquadran(void);
void donextstep(void);
void convertarray(void);
```

```
void patternmatch(void);
void inithistory(void);
void createstack(void);
void getlearningmove(void);
void abconstack(void);
void moveintemp(void);
void learningresponse(void);
void showlearnintro(void);
void showtabularasatext(void);
void showlearnstartoptions(void);
void showlearnresults(void);
void showgameresults(void);
void showmodedresults(void);

/* global defines */ define DEMOMAP00 1  /* DEMOMAP00-DEMOMAP33 are the values in the */
define DEMOMAP01 0  /* default map which is used if the user does */
#define DEMOMAP02 1  /* not use dogame to change it */
#define DEMOMAP03 1
#define DEMOMAP10 0
#define DEMOMAP11 1
#define DEMOMAP12 0
#define DEMOMAP13 0
#define DEMOMAP20 1
#define DEMOMAP21 1
#define DEMOMAP22 1
#define DEMOMAP23 0
#define DEMOMAP30 1
#define DEMOMAP31 0
#define DEMOMAP32 1
#define DEMOMAP33 1
#define CLIP_ON 1    /* activates clipping in viewport */
#define INITMAXMOVES 50
#define INITMAXRANDOMMOVES 20
#define INITMODE 1   /* i.e. show each position; */
                     /* report after 10 searches */
#define INITSPEED 40 /* i.e. 40/100 second */
#define INITMAXNOMATCH 30   /* N.B. must be less than INITMAXMOVES */
#define INITSESSIONMAX 200 /* i.e. two hundred searches before report */
#define INITMAXSEARCHES 20 /* i.e. 20 thousand searches before report */
#define INITSTABLENO 1 /* i.e. one thousand searches with no random move */
                     /* N.B. must be less than INITMAXSEARCHES */
#define INITLEARNINGLENGTH 4 /* the limited length; */
                     /* N. B. must be less than STACKLENGTH */
#define INITTABULARASA 1 /* 1 = yes; 0 = no */
#define HATCH_FILL 7 /* pattern for current position in map */
#define MAXRANNO 16 /* maximum random number--should be HORIZ*VERT */
#define STACKLENGTH 10 /* length of the stack */
#define MAXREPEATCOUNT 8 /* limit on the number of repeated patterns */
                     /* without a change in learnsession */
#define HORIZ 4 /* width of maparray */
#define VERT 4 /* height of maparray */

/* global data structures */ short int demomap[4][4]; /* the default map, set to the values */
                /* DEMOMAP00-DEMOMAP33 by the function */
                /* sta2rtgui */
char fwdabbrev[10]; /* holds "Fwd" */
char bkwdabbrev[10]; /* holds "Bkwd" */
char clkwseabbrev[10]; /* holds "Clkwse" */
char ctrclkabbrev[10]; /* holds "Ctrclk" */
char nomoveabbrev[10]; /* holds "NoMove" */
short int mapvalues[4][4]; /* the current values of the map */
                /* 0 and 1 are values; 2 means 0(a); */
                /* 3 1(a); 4 0(b); 5 1(b): 6 0(c); 7 1(C) */
```

```c
short int convertedmap[4][4]; /* for converted maparray with abc */
short int patternvalues[3]; /* the current pattern */
short int guiflags[4]; /* flags used by showgui to decide what part */
                      /* of gui to update; 0 indicates no change, */
                      /* 1 indicates update is needed */
                      /* order of flags:  map, pattern, history */
short int quadranno = 4; /* initialized to 4 to indicate that getquadran has */
                         /* not been successfully called yet */
short int currentmove = 0; /* initialized to zero and returns to zero */
                           /* 1 means advance a to b etc.; 2 means b to */
                           /* a etc.; 3 means rotate a, c clockwise; */
                           /* 4 means rotate a, c counterclockwise */
                           /* further moves could be defined as needed */
short int match = 2; /* 0 means no match, 1 a match, 2 initial */
short int ranno = MAXRANNO; /* initialized to MAXRANNO */
                            /* to indicate that getranno has not been */
                            /* successfully called yet */
int currentloc[3]; /* [0] is row, [1] is col, [2] is direction */
int thislocpattern[3]; /* saves the pattern at currentloc */
int lastlocpattern[3]; /* saves the pattern at the previous currentloc */
int thisabc[6]; /* saves a, b, c locations for showmove */
int lastabc[6]; /* saves the previous a, b, c locations */
int resultscount; /* used to pass successcount to showsearchresults */
int resultsum; /* used to pass stepsum to showsearchresults */
int maxnomatch; /* global but set in dogame */
int learninglength; /* global set in dogame */
int maxmoves; /* used in dosearch to limit number of moves per search */
int maxrandommoves; /* limits random moves after maxnomatch in dolearn */
                    /* and dogame; can be changed in dogame */
int tabularasa; /* set in dogame to zero or one */
int sessionmax; /* set in dogame for Mode B only */
short int mode; /* holds the current mode, whether A (i.e. 1), */
                /* B (i.e. 2), C (i.e. 3), or D (i.e. 4) */
int speed; /* holds the display speed, not now editable */
int maxsearches; /* holds the maximum number of searches per */
                 /* report for Mode C */
int stableno; /* holds the number of searches without a random */
              /* move that is defined as stability; not now editable */
short int exitgame; /* exit game if 0, keep playing if 1 */
int resultlearncount; /* used to pass count of searches to showlearnresults */
int resultstepmax; /* used to pass max no of moves to showlearnresults */
int resultstepaverage; /* used to pass average no of moves to showlearnresult
/
int history[2][2][2][2]; /* history[a][b][c][0] temporarily saves */
                         /* a value generated for a move after reading a, b, c
/
                         /* history[a][b][c][1] holds a learned value */
                         /* for a, b, c; in each case, */
                         /* the value indicates a move to be made */
                         /* from a limited number of possible moves */
int stepstack[STACKLENGTH][3]; /* saves, for up to STACKLENGTH steps, */
                               /* the pattern a, b, c each step responded to */
short int stacklocation = 0; /* the current location in stepstack */
short int stackstart = 0; /* the start of the current stack, must */
                          /* be prevented from passing or being passed */
                          /* by stacklocation */
short int repeatcount; /* counts repeats during learnsession, used by */
                       /* getlearningmove */
short int cyclecount; /* counts number of steps since last match during */
                      /* learnsession, used by getlearningmove */
int sincerandommove; /* used during learning to keep track */
                     /* of number of searches since last randommove */
short int gotrandommove; /* used during learning to indicate that */
                         /* getlearningmove got a random move */ int main ()
{
char inbuf[10];
```

```
char yesorno;

/* initialize for searching and learning */ randomize();

/* initialize for graphics */ doinitgraph();

/* display title */ titlescreen();

/* display legal mumbo jumbo */ legalscreen();

/* next call guiscreen, which displays the GUI screen and handles */
/* all user requests made therein; when the user exits the GUI    */
/* screen, control comes back here to close up graphics           */ guiscreen();

/* clean up after graphics operations--this could be moved out */ closegraph();
return 0;

}

/* Function definitions */ int doinitgraph(void)

/* doinitgraph calls initgraph and initializes for graphics */

/* in product version, consider a command line message telling user */
/* what to expect if the correct driver for display cannot be loaded */

{
char inbuf[10];
char yesorno;

/* request auto detection */ int gdriver = DETECT, gmode, errorcode;
int midx, midy;

/* initialize graphics mode */ initgraph(&gdriver, &gmode, "");

/* read result of initialization */ errorcode = graphresult();

if (errorcode != grOk)   /* an error occurred */
    {
        printf("Graphics error: %s\n", grapherrormsg(errorcode));
        printf("Press any key to halt:");
        getch();
        exit(1);          /* return with error code */
    } return 0;

}
```

```c
void titlescreen(void)

/* titlescreen presents the title and a copyright notice, plus */
/* indicates that user should press a key to continue */

{
int midx, uppery, lowery;

cleardevice();

midx = getmaxx() / 2;
uppery = (getmaxy() / 4);
lowery = (3 * (getmaxy()) / 4);

/* output title in upper half of the screen */
/* Note: the C.P. doesn't get changed.      */ settextstyle(DEFAULT_FONT, HORIZ_DIR, 4);

settextjustify(CENTER_TEXT, CENTER_TEXT);

outtextxy(midx, uppery, "PATTERN WITCH (TM)");

settextstyle(DEFAULT_FONT, HORIZ_DIR, 2);

outtextxy(midx, (2 * uppery), "SELF-PROGRAMMER");

/* output copyright notice and instructions in lower half */ settextstyle(DEFAULT_FONT, HORIZ_DIR, 2);

outtextxy(midx, (lowery - 32), "Copyright (c) James T. Beran 1992-93.");

outtextxy(midx, (lowery + 8), "All Rights Reserved.");

outtextxy(midx, (lowery + 64), "Press a key to begin.");

getch();

} void legalscreen(void)

/* legalscreen prints the paragraphs re permission, disclaimer, */
/* and my address, then asks user to press a key to continue */

{
cleardevice();

printf("Welcome to the Pattern Witch (TM) self-programmer!\n\n");
printf("(c) Copyright James T. Beran 1992-93.  All Rights Reserved.\n\n");
printf("You have permission to run this executable code\n");
printf("and copy it for backup, provided that any copy must contain\n");
printf("the above copyright notice and this paragraph.  This is\n");
printf("incomplete experimental software, however, and it\n");
printf("may contain errors and bugs.  Therefore, this software is\n");
printf("provided AS IS, with no warranty of any kind.  James T. Beran\n");
printf("expressly disclaims all warranties, express or implied,\n");
printf("including without limitation the implied warranties of\n");
printf("merchantability and fitness for a particular purpose,\n");
printf("and notwithstanding any other provision contained herein,\n");
printf("James T. Beran expressly disclaims any liability for damages\n");
printf("resulting from the software or its use, whether arising in\n");
printf("contract, tort (including negligence), or strict liability,\n");
printf("even if advised of the possibility of such damages.\n\n");
printf("If you want further information about Pattern Witch products,\n");
printf("want to subscribe to the Pattern Witch Newsletter, or wish to\n");
```

```c
printf("report a bug, please write James T. Beran,\n");
printf("2101 California Street, Apt. 104, Mountain View,\n");
printf("California 94040, U.S.A.\n\n");
printf("Press a key when you are ready to continue.\n");

getch();

} int guiscreen(void)

/* guiscreen is the main routine for the GUI screen; it calls */
/* other functions to do most of the dirty work */

{
char inbuf[10];
char responsechar;
int rungui;

/* first, clear the display and initialize map, pattern, parameters */ cleardevice();
startgui();
gotoxy(1, 1);

/* then, call starttext to present the text viewport and ask */
/* whether to do an introduction to GUI; handle response here */ starttext();

gets(inbuf);
sscanf(inbuf, "%c", &responsechar);
if ((responsechar == 72) || (responsechar == 104)) /* large or small "h" *
        guiintro();
        else if ((responsechar == 81) || (responsechar == 113))
                /* large or small "q" */
                return 0;

responsechar = '\0';

/* now we are ready for the main course; */
/* showoptions presents a message asking whether the user */
/* wants a Game (play with map, pattern, parameters--done by dogame); */
/* Search (randomly with no learning--done by dosearch); Learn */
/* (the default if the responsechar is not an "g", "s", "h", */
/* or "q"--done by dolearn); see Help (i.e. guiintro); or */
/* Quit (shutting down fndrcde.c--only available from */
/* guiscsreen per functions it calls); dogame, dosearch, and */
/* dolearn all include one or more calls to showgui, which */
/* presents the full GUI screen in its current state */

/* some functions include another option that is on the */
/* menu--eXit (the current activity, to return to the calling */
/* function--e.g. if the current activity is a session */
/* of dosearch or dolearn, eXit goes back to guiscreen; eXit */
/* is not available in guiscreen itself, only Quit) */ rungui = 1;
while (rungui == 1)
{ /* begin while */
showoptions();

gets(inbuf);
sscanf(inbuf, "%c", &responsechar);

if ((responsechar == 81) || (responsechar == 113))
        /* large or small "q" */
        {
            rungui = 0;
```

```
        }
        else
        {
        if ((responsechar == 72) || (responsechar == 104))
                /* large or small "h" */
                guiintro();
        else
        {
        if ((responsechar == 71) || (responsechar == 103))
                /* large or small "g" */
                dogame();
        else
        {
        if ((responsechar == 83) || (responsechar == 115))
                /* large or small "s" */
                dosearch();
        else dolearn();
        }
        }
        } responsechar = '\0';

} /* end while */ return 0;
} void starttext(void)

/* starttext creates the text window and presents a message */
/* in it asking the user to press "H" and then "Enter" */
/* for an introduction */

{
cleardevice();

showtitlebar();

settextstyle(DEFAULT_FONT, HORIZ_DIR, 2);

settextjustify(CENTER_TEXT, CENTER_TEXT);

outtextxy((((getmaxx() - 290) / 2) + 20), getmaxy() - 10, "TEXT");

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display intro text */
outtextxy(0, 4, "This is the text");
outtextxy(0, 20, "window.  It");
```

```c
outtextxy(0, 36, "provides information");
outtextxy(0, 52, "about this Pattern");
outtextxy(0, 68, "Witch (TM) software");
outtextxy(0, 84, "and asks you to make");
outtextxy(0, 100, "choices. You usually");
outtextxy(0, 116, "choose by pressing a");
outtextxy(0, 132, "key and then Enter or");
outtextxy(0, 148, "Return.");
outtextxy(0, 164, "");
outtextxy(0, 180, "For an introduction");
outtextxy(0, 196, "to this software,");
outtextxy(0, 212, "enter H (help).");
outtextxy(0, 228, "");
outtextxy(0, 244, "To exit from self-");
outtextxy(0, 260, "programming, enter Q");
outtextxy(0, 276, "(quit).");
outtextxy(0, 292, "");
outtextxy(0, 308, "For self-programming,");
outtextxy(0, 324, "enter some other key.");
outtextxy(0, 340, "(not H or Q)");
outtextxy(0, 356, "");
outtextxy(0, 372, "");
outtextxy(0, 388, "");
outtextxy(0, 404, "");

} int guiintro(void)

/* guiintro lays out other parts of the GUI screen one by one, */
/* explaining how each is used in Pattern Witch; guiintro ends */
/* by asking the user to press a key to start playing a game, */
/* searching, learning, or quit */

{
char inbuf[10];
char responsechar;

/* call intromap to show the blank map and a message explaining */
/* it; intromap ends with a request to press X to leave guiintro */
/* or to press another key to continue */ intromap();

gets(inbuf);
sscanf(inbuf, "%c", &responsechar);
if ((responsechar == 88) || (responsechar == 120))
        /* large or small "X" */
        {
        return 0;
        } responsechar = '\0';

/* call intropattern to show the default pattern (0, 0, 0) */
/* and explain it; intropattern ends with a request to press */
/* X to leave guiintro or to press another key to continue */ gotoxy(1, 1);

intropattern();

gets(inbuf);
sscanf(inbuf, "%c", &responsechar);

if ((responsechar == 88) || (responsechar == 120))
        /* large or small "X" */
        {
        return 0;
```

```
responsechar = '\0';

/* call introhistory to show a blank history and explain it; */
/* introhistory ends with a request to press a key to continue */ introhistory();

getch();
return 0;

} void startgui(void)

/* startgui initializes guiflags, currentloc, */
/* map, pattern, parameters, and abbreviations */

{
int m, n;

/* guiflags are cleared for showgui */ guiflags[0] = guiflags[1]= guiflags[2] = guiflags[3] = 0;

/* currentloc is moved outside map */ currentloc[0] = currentloc[1] = currentloc[2] = 4;

/* initialize: map is demomap, pattern is (0, 0, 0), abbreviations */
/* have character string values, parameters are at initial values */

/* first set values in demomap[4][4] */ demomap[0][0] = DEMOMAP00;
demomap[0][1] = DEMOMAP01;
demomap[0][2] = DEMOMAP02;
demomap[0][3] = DEMOMAP03;
demomap[1][0] = DEMOMAP10;
demomap[1][1] = DEMOMAP11;
demomap[1][2] = DEMOMAP12;
demomap[1][3] = DEMOMAP13;
demomap[2][0] = DEMOMAP20;
demomap[2][1] = DEMOMAP21;
demomap[2][2] = DEMOMAP22;
demomap[2][3] = DEMOMAP23;
demomap[3][0] = DEMOMAP30;
demomap[3][1] = DEMOMAP31;
demomap[3][2] = DEMOMAP32;
demomap[3][3] = DEMOMAP33;

/* then set mapvalues to demomap */ for (m = 0; m < 4; m = m + 1)
        {
        for (n = 0; n < 4; n = n + 1)
                {
                mapvalues[m][n] = demomap[m][n];
                }
        } patternvalues[0] = patternvalues[1] = patternvalues[2] = 0;

/* initialize abbreviations for history */ for (n = 0; n < 8; n = n + 1)
```

```
{
fwdabbrev[n] =
bkwdabbrev[n] =
clkwseabbrev[n] =
ctrclkabbrev[n] =
nomoveabbrev[n] = 0;
} nomoveabbrev[0] = 78;
nomoveabbrev[1] = 111;
nomoveabbrev[2] = 109;
nomoveabbrev[3] = 111;
nomoveabbrev[4] = 118;
nomoveabbrev[5] = 101;
nomoveabbrev[6] = '\0';

fwdabbrev[0] = 70;
fwdabbrev[1] = 119;
fwdabbrev[2] = 100;
fwdabbrev[3] = '\0';

bkwdabbrev[0] = 66;
bkwdabbrev[1] = 107;
bkwdabbrev[2] = 119;
bkwdabbrev[3] = 100;
bkwdabbrev[4] = '\0';

clkwseabbrev[0] = 67;
clkwseabbrev[1] = 108;
clkwseabbrev[2] = 107;
clkwseabbrev[3] = 119;
clkwseabbrev[4] = 115;
clkwseabbrev[5] = 101;
clkwseabbrev[6] = '\0';

ctrclkabbrev[0] = 67;
ctrclkabbrev[1] = 116;
ctrclkabbrev[2] = 114;
ctrclkabbrev[3] = 99;
ctrclkabbrev[4] = 108;
ctrclkabbrev[5] = 107;
ctrclkabbrev[6] = '\0';

/* finally, the main parameters */ maxmoves = INITMAXMOVES; /* used only in dosearch */
maxrandommoves = INITMAXRANDOMMOVES; /* used in dolearn and dogame */
mode = INITMODE;
speed = INITSPEED;
maxnomatch = INITMAXNOMATCH;
sessionmax = INITSESSIONMAX;
maxsearches = (INITMAXSEARCHES * 1000);
stableno = (INITSTABLENO * 1000);
learninglength = INITLEARNINGLENGTH;
tabularasa = INITTABULARASA;

} void dogame(void)

/* dogame provides an interface for changing the map, pattern, */
/* mode, and parameters; then dogame calls learnforgame to try */
/* the map and pattern with the mode and parameters */

{
exitgame = 1;
```

```c
/* first show introductory text, which ends asking user to press */
/* a key to begin a game session */ showgameintro();
getch();

/* then begin a loop that continues until user presses X to exit */ while (exitgame != 0)
{ /* start outer while loop */

/* first let user edit map or pattern by showing a character in */
/* each square that user can enter to change the square's value; */
/* a future improvement of editmaporpattern will save maps */
/* and present them in a sequence for the user to select one. */ editmaporpattern();

/* then let user select mode or edit parameters; list each mode by */
/* character for one to be selected and list values of parameters */
/* that can be chosen, each with a character to select it; */
/* after each edit, show mode and parameters and ask if user */
/* wants to change any more */ if (exitgame != 0)
        editmodeorparameters();

/* then run a learn session for Map and Pattern with Mode */
/* and parameters */ if (exitgame != 0)
        {
        learnforgame();
        }

} /* end while loop */

} void dosearch(void)

/* dosearch performs random searching without learning using */
/* the current map and the current pattern */

{
int samplecount = 0;
char responsechar;
char inbuf[10];
short int stop = 1;
int successcount;
short int stepsum = 0;
int showcount = 0;
int resultsno, updateno;
int elapsedmsecs, msecsremain;
clock_t start, end;

/* set up same as Mode A */ resultsno = 10;
updateno = 1;

/* first show introductory text, which ends asking user to press */
/* a key to begin a search session with the current parameters */ showsearchintro();
getch();
```

```c
/* then begin a loop that continues until user presses X to exit */ while (stop != 0)
{ /* start outer while loop */ for (successcount = 0; successcount < resultsno;
        successcount++)
{ /* start for loop */ startposition();

if (updateno != 0)
        {
        showstartingposition();
        gets(inbuf);
        sscanf(inbuf, "%c", &responsechar);
        if ((responsechar == 88) || (responsechar == 120))
                /* large or small "X" */
                {
                stop = 0;
                samplecount = maxmoves; /* shortcircuits inner while */
                successcount = resultsno; /* and for loop */
                }
                else
                {
                inbuf[0] = inbuf[1] = inbuf[2] = '\0';
                start = clock();
                } responsechar = '\0';

} showcount = 0;

while ((match != 1) && (samplecount < maxmoves))

{ /* begin inner while loop */
        getquadran();
        currentmove = (quadranno + 1);

donextstep();
        patternmatch();

if ((updateno != 0) && (match != 1))
        {
        showcount++;
        if (showcount >= updateno)
                {
                convertarray();
                showmove();
                showcount = 0;
                if (start != -1)
                {
                end = clock();
                elapsedmsecs = ((1000 * (end - start)) / CLK_TCK);
                msecsremain = ((speed * 10) - elapsedmsecs);
                if ((elapsedmsecs < (speed * 10)) &&
                        (msecsremain < 5000) &&
                        (msecsremain > 100))
                        delay(msecsremain);
                printf("\a");
                start = clock();
                }

}

} /* end outer if */
```

```c
            samplecount++;
            } /* end of inner while loop */ if ((updateno != 0) && (stop != 0))
            { /* begin outer if */
            convertarray();
            showmove();
            if (start != -1)
                    {
                    end = clock();
                    /* could insert a delay here before beep, but */
                    /* quick beep may suggest snapping into place */
                    printf("\a");
                    delay(1500);
                    start = clock();
                    }

} /* end outer if */ stepsum = stepsum + samplecount;
    samplecount = 0;
    match = 2; /* reinitializes match for patternmatch */

} /* end of for loop */ resultscount = successcount;
    resultsum = stepsum;

if (stop != 0)
            {
            showsearchresults();

gets(inbuf);
            sscanf(inbuf, "%c", &responsechar);
            if ((responsechar == 88) || (responsechar == 120))
                    /* large or small "X" */
                    {
                    stop = 0;
                    } responsechar = '\0';

} stepsum = 0;

} /* end outer while loop */

} void dolearn(void)

/* dolearn performs learning with the current map, pattern, and */
/* parameters, reporting results under Mode A, Mode B (sessionmax */
/* searches), or Mode C (maxsearches searches); the user must */
/* occasionally press a key to continue; each cycle can update */
/* a move count until success; each search can update a count */
/* of searches in this session and a count of searches since the */
/* last random move; dolearn calls showgui to show history; */
/* after each report, check whether user has requested abort or */
/* a mode shift */

{
int stepcount = 0;
```

```c
char responsechar;
char inbuf[10];
short int stop = 1;
int successcount, maxtotalmoves;
short int stepsum = 0;
int showcount = 0;
int updateno, resultsno;
int resultsmagnitude;
int maxstepno = 0;
int elapsedmsecs, msecsremain;
clock_t start, end;

maxtotalmoves = (maxnomatch + maxrandommoves);

/* first show introductory text, which ends asking user to press */
/* a key to begin a learn session with the current parameters */ showlearnintro();
getch();

/* then initialize history if tabula rasa is requested */ showhistorysquares();
if (tabularasa == 1)
        {
        inithistory();
        showtabularasatext();
        delay(3000);
        showgui();
        }

/* then use mode to initialize resultsno and updateno */ if (mode == 1)
        {
        resultsno = 10;
        updateno = 1;
        }
else
{
if (mode == 2)
        {
        resultsno = sessionmax;
        updateno = 0;
        }
else
{
if (mode == 3)
        {
        resultsno = maxsearches;
        updateno = 0;
        }
else    /* default is same as Mode A */
        {
        resultsno = 10;
        updateno = 1;
        }
}
}

/* then, initialize stack */ createstack();

/* then begin a loop that continues until user presses X to exit */ while (stop != 0)
{ /* start outer while loop */
```

```
showlearnstartoptions();

/* get user's response-- if an A, use mode A; if a B use */
/* mode B; if a C or D use mode C; if anything else, keep the current mode;

gets(inbuf);
sscanf(inbuf, "%c", &responsechar);
if ((responsechar == 65) || (responsechar == 97))
        /* large or small "A" */
        {
        resultsno = 10;
        updateno = 1;
        mode = 1;
        }
        else if ((responsechar == 66) || (responsechar == 98))
        /* large or small "B" */
        {
        resultsno = sessionmax;
        updateno = 0;
        mode = 2;
        }
        else if ((responsechar == 67) || (responsechar == 99))
        /* large or small "C" */
        {
        resultsno = maxsearches;
        updateno = 0;
        mode = 3;
        }
        else if ((responsechar == 68) || (responsechar == 100))
        /* large or small "D" */
        {
        resultsno = maxsearches;
        updateno = 0;
        mode = 3;
        }
        else
        {
        } responsechar = '\0';

sincerandommove = 0;
gotrandommove = 0;

/* now start learning with the current value of resultsno */ for (successcount = 0; successcount < resultsno;
        successcount++)
{ /* start for loop */ if (sincerandommove < stableno)

{ /* start if--else sets successcount to short circuit session */ showcount = 0;

match = 1;
while (match == 1)
{
startposition();
patternmatch();
} /* never start on pattern, never learn a move */
/* for pattern */ if (updateno != 0)
        {
        showstartingposition();
```

```
                gets(inbuf);
                sscanf(inbuf, "%c", &responsechar);
                if ((responsechar == 88) || (responsechar == 120))
                        /* large or small "X" */
                        {
                        stop = 0;
                        stepsum = maxtotalmoves; /* shortcircuits if */
                        successcount = resultsno; /* and for loop */
                        match = 2; /* and while loop */
                        stepcount = maxtotalmoves; /* and another while loop *
                        }
                        else
                        {
                        start = clock();
                        }
                responsechar = '\0';
                }
        if (stop != 0)
                {
                stepcount = cyclecount = 0;
                stacklocation = stackstart = 0;
                stepstack[stacklocation][0] =
                        stepstack[stacklocation][1] =
                        stepstack[stacklocation][2] = 2;
                } while ((match != 1) && (stepcount < maxtotalmoves))

{ /* begin inner while loop */
                getlearningmove();
                abconstack();
                moveintemp();
                donextstep();
                patternmatch();

if ((thislocpattern[0] == lastlocpattern[0]) &&
                        (thislocpattern[1] == lastlocpattern[1]) &&
                        (thislocpattern[2] == lastlocpattern[2]))
                        {
                        repeatcount++;
                        }
                        else repeatcount = 0;

if ((updateno != 0) && (match != 1))
                {
                showcount++;
                if (showcount >= updateno)
                        {
                        convertarray();
                        showmove();
                        showcount = 0;
                        if (start != -1)
                        {
                        end = clock();
                        elapsedmsecs = ((1000 * (end - start)) / CLK_TCK;
                        msecsremain = ((speed * 10) - elapsedmsecs);
                        if ((elapsedmsecs < (speed * 10)) &&
                                (msecsremain < 5000) &&
                                (msecsremain > 100))
                                delay(msecsremain);
                        printf("\a");
                        start = clock();
                        }

}

} /* end outer if */
```

```
                cyclecount++;
                stepcount++;
                } /* end inner while loop */ if (stepcount > maxstepno)
                maxstepno = stepcount;

if ((updateno != 0) && (stop != 0))
                { /* begin outer if */
                convertarray();
                showmove();
                if (start != -1)
                        {
                        end = clock();
                        /* could insert a delay here before beep, but */
                        /* quick beep may suggest snapping into place */
                        printf("\a");
                        delay(1500);
                        start = clock();
                        }

} /* end outer if */ stepsum = stepsum + stepcount;
        if (match == 1)
                {
                learningresponse();
                guiflags[2] = 1;
                }
        stepcount = 0;
        resultlearncount = (successcount + 1);
        match = 2; /* reinitializes match for patternmatch */
        if (sincerandommove <= stableno)
                sincerandommove++;
        if (gotrandommove == 1)
                sincerandommove = 0;
        gotrandommove = 0;

} /* end if */
        else
        {
        resultlearncount = (successcount + 1);
        successcount = resultsno;
        }

} /* end of for loop */ resultstepmax = maxstepno;
        resultstepaverage = (stepsum / resultlearncount);

if (stop != 0)
                {
                showgui();
                showlearnresults();

gets(inbuf);
                sscanf(inbuf, "%c", &responsechar);
                if ((responsechar == 88) || (responsechar == 120))
                        /* large or small "X" */
                        {
                        stop = 0;
                        } responsechar = '\0';

} stepsum = 0;
```

```c
maxstepno = 0;

}   /* end outer while loop */

} void showgui(void)

/* showgui displays the GUI screen with the current map, pattern, */
/* and parameters; it should be done before calling outtextxy */
/* to write something in the text viewport; when a part of the */
/* GUI screen is modified, a flag should be set so that showgui */
/* only updates those parts that have changed; the screen can */
/* be divided into viewports with one flag per viewport */

{
if (guiflags[0] == 1)
        shownewmap();
if (guiflags[1] == 1)
        shownewpattern();
if (guiflags[2] == 1)
        shownewhistory();

guiflags[0] = guiflags[1] = guiflags[2] = guiflags[3] = 0;

} void showtitlebar(void)

/* showtitlebar shows the title and copyright notice in a */
/* 40 pixel area at the top of the screen */

{
int midrightx, midleftx, midy, uppery, lowery;

midrightx = (3 * (getmaxx()) / 4);
midleftx = (getmaxx() / 4);
midy = 20;
uppery = 10;
lowery = 30;

/* output title in left half of the titlebar */
/* Note: the C.P. doesn't get changed.       */ settextstyle(DEFAULT_FONT, HORIZ_DIR, 2);

settextjustify(CENTER_TEXT, CENTER_TEXT);

outtextxy(midleftx, midy, "PATTERN WITCH (TM)");

/* output copyright notice in right half of titlebar */ settextstyle(DEFAULT_FONT, HORIZ_DIR, 1);

outtextxy(midrightx, uppery, "Copyright (c) James T. Beran 1992-93.");

outtextxy(midrightx, lowery, "All Rights Reserved.");

} int intromap(void)

/* intromap shows a blank map and explains it; then, if the user */
/* presses a key to continue rather than X to exit, intromap */
/* shows a demomap and explains it; intromap ends by asking */
/* the user to press X to eXit guiintro or a key to continue */
```

```c
{
char inbuf[10];
char responsechar;

showblankmap();

gets(inbuf);
sscanf(inbuf, "%c", &responsechar);
if ((responsechar == 88) || (responsechar == 120))
        /* large or small "X" */
        {
        showintroexit();
        return 0;
        }
        else
        {
        showdemomap();
        getch();
        showintroexit();
        return 0;
        }

} void showblankmap(void)

/* showblankmap draws the map, complete with title, but with */
/* a checkerboard; it puts text in the text window explaining */
/* the map briefly, and telling the user to press X to leave */
/* the intro to the map, any other key to see a demo map */

{
int m, n;
int startx = 379; /* define globals that can be used to set */
int starty = 40;  /* startx, starty, and squaresize */
int squaresize = 60;
int oncolor = getmaxcolor();
int offcolor = 0;
int bordercolor = (getmaxcolor() / 2);
int floodcolor;
int poly[8];

/* show title of map viewport in the default full-screen viewport */ setviewport(0,0,getmaxx(), getmaxy(), CLIP_ON);

settextstyle(DEFAULT_FONT, HORIZ_DIR, 2);

settextjustify(CENTER_TEXT, CENTER_TEXT);

outtextxy((startx + (2 * squaresize)),
        (starty + (4 * squaresize) + 10), "1:  MAP");

/* create map viewport */
setviewport(startx, 40, getmaxx()-18,
        (starty + (4 * squaresize) + 1), CLIP_ON);

clearviewport();

/* draw the map row by row, m indicating row and n indicating */
/* column; each square has a one pixel boundary of medium color */
/* and an interior that is black to indicate OFF or white to */
/* indicate ON */ for (m = 0; m < 4; m = m + 1)
        {
        for (n = 0; n < 4; n = n + 1)
```

```c
                {
                setcolor(bordercolor);

if (((m + n) == 0) || ((m + n) == 2) ||
                    ((m + n) == 4) || ((m + n) == 6))
                    {
                    floodcolor = offcolor;
                    }
                    else floodcolor = oncolor;

setfillstyle(SOLID_FILL, floodcolor);

poly[0] = poly[6] = (n * squaresize);
                poly[1] = poly[3] = (m * squaresize);
                poly[2] = poly[4] = ((n + 1) * squaresize);
                poly[5] = poly[7] = ((m + 1) * squaresize);

fillpoly(4, poly);
                }
        } gotoxy(1, 1); /* cursor to upper left to prevent scrolling */

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing map */
outtextxy(0, 4, "This is the map,");
outtextxy(0, 20, "a 4 by 4 array");
outtextxy(0, 36, "of binary values");
outtextxy(0, 52, "shown as black and");
outtextxy(0, 68, "white.  The map is");
outtextxy(0, 84, "shown with alternate");
outtextxy(0, 100, "black and white");
outtextxy(0, 116, "values, but you can");
outtextxy(0, 132, "change the values");
outtextxy(0, 148, "in playing the Game.");
outtextxy(0, 164, "");
outtextxy(0, 180, "To exit from the");
outtextxy(0, 196, "introduction to the");
outtextxy(0, 212, "map, enter X (exit).");
outtextxy(0, 228, "");
outtextxy(0, 244, "To see a map that I");
outtextxy(0, 260, "will use by default");
outtextxy(0, 276, "if you don't use Game");
outtextxy(0, 292, "to create another");
outtextxy(0, 308, "map, enter some");
outtextxy(0, 324, "other key.  (not X)");
outtextxy(0, 340, "");
outtextxy(0, 356, "");
outtextxy(0, 372, "");
```

```c
outtextxy(0, 388, "");
outtextxy(0, 404, "");
} void showdemomap(void)

/* showdemomap makes the demomap the current map, presents */
/* it, and explains it to the user; then showdemomap asks */
/* the user to press a key to continue */

{
int m, n;
int startx = 379; /* define globals that can be used to set */
int starty = 40;  /* startx, starty, and squaresize */
int squaresize = 60;
int oncolor = getmaxcolor();
int offcolor = 0;
int bordercolor = (getmaxcolor() / 2);
int floodcolor;
int poly[8];

/* create map viewport */
setviewport(startx, 40, getmaxx()-18,
        (starty + (4 * squaresize) + 1), CLIP_ON);

clearviewport();

/* draw the map row by row, m indicating row and n indicating */
/* column; each square has a one pixel boundary of medium color */
/* and an interior that is black to indicate OFF or white to */
/* indicate ON */ for (m = 0; m < 4; m = m + 1)
        {
        for (n = 0; n < 4; n = n + 1)
                {
                setcolor(bordercolor);

if (mapvalues[m][n] == 0)
                        {
                        floodcolor = offcolor;
                        }
                        else floodcolor = oncolor;

setfillstyle(SOLID_FILL, floodcolor);

poly[0] = poly[6] = (n * squaresize);
                poly[1] = poly[3] = (m * squaresize);
                poly[2] = poly[4] = ((n + 1) * squaresize);
                poly[5] = poly[7] = ((m + 1) * squaresize);

fillpoly(4, poly);
                }
        } gotoxy(1, 1); /* cursor to upper left to prevent scrolling */

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));
```

```c
/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing map */
outtextxy(0,   4, "This is the");
outtextxy(0,  20, "default map.  I");
outtextxy(0,  36, "move around in the");
outtextxy(0,  52, "map looking for a");
outtextxy(0,  68, "pattern of three");
outtextxy(0,  84, "values.  The map");
outtextxy(0, 100, "wraps around on all");
outtextxy(0, 116, "four sides, so that");
outtextxy(0, 132, "the pattern can");
outtextxy(0, 148, "also wrap around.");
outtextxy(0, 164, "Note the pattern of");
outtextxy(0, 180, "of three black");
outtextxy(0, 196, "squares in the second");
outtextxy(0, 212, "row, a pattern that");
outtextxy(0, 228, "occurs only once in");
outtextxy(0, 244, "this map.");
outtextxy(0, 260, "");
outtextxy(0, 276, "When you are ready");
outtextxy(0, 292, "to continue, press a");
outtextxy(0, 308, "key.");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void intropattern(void)

/* intropattern draws the pattern with (0, 0, 0) and */
/* presents a text explaining it briefly; intropattern */
/* ends asking the user to press X to stop the intro or */
/* any other key to continue */

{
int m;
int startx = 409;  /* define globals that can be used to set */
int starty = 300;  /* startx, starty, and squaresize */
int squaresize = 60;
int oncolor = getmaxcolor();
int offcolor = 0;
int bordercolor = (getmaxcolor() / 2);
int floodcolor;
int poly[8];

/* show title of pattern viewport in the default full-screen viewport setviewport(0,0,getmaxx(), getmaxy(), CLIP_ON);

settextstyle(DEFAULT_FONT, HORIZ_DIR, 2);

settextjustify(CENTER_TEXT, CENTER_TEXT);
```

```c
outtextxy(((startx + ((3 * squaresize) / 2)),
        (starty + squaresize + 10), "2:  PATTERN");

/* create pattern viewport */
setviewport(startx, starty, (startx + (3 * squaresize) + 1),
        (starty + squaresize + 1), CLIP_ON);

clearviewport();

/* draw the pattern with m indicating the square; */
/* each square has a one pixel boundary of medium color */
/* and an interior that is black to indicate OFF or white to */
/* indicate ON */ for (m = 0; m < 3; m = m + 1)
        {
        setcolor(bordercolor);
        if (patternvalues[m] == 0)
                {
                floodcolor = offcolor;
                }
                else floodcolor = oncolor;

setfillstyle(SOLID_FILL, floodcolor);

poly[0] = poly[6] = (m * squaresize);
        poly[1] = poly[3] = 0;
        poly[2] = poly[4] = (((m + 1) * squaresize) - 1);
        poly[5] = poly[7] = (squaresize - 1);

fillpoly(4, poly);
        } gotoxy(1, 1); /* cursor to upper left to prevent scrolling */

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing map */
outtextxy(0, 4, "The pattern is");
outtextxy(0, 20, "a 1 x 3 array of");
outtextxy(0, 36, "binary values.  I");
outtextxy(0, 52, "search for positions");
outtextxy(0, 68, "in the map where the");
outtextxy(0, 84, "pattern occurs.  The");
outtextxy(0, 100, "pattern can wrap");
outtextxy(0, 116, "from one edge of the");
outtextxy(0, 132, "map around to the");
outtextxy(0, 148, "opposite side.  In");
```

```
outtextxy(0, 164, "the Game, you can");
outtextxy(0, 180, "change the pattern");
outtextxy(0, 196, "to different values.");
outtextxy(0, 212, "");
outtextxy(0, 228, "To exit from the");
outtextxy(0, 244, "introduction to the");
outtextxy(0, 260, "map, enter X (exit).");
outtextxy(0, 276, "");
outtextxy(0, 292, "To continue the");
outtextxy(0, 308, "introduction, enter");
outtextxy(0, 324, "some other key.");
outtextxy(0, 340, "(not X)");
outtextxy(0, 356, "");
outtextxy(0, 372, "");
outtextxy(0, 388, "");
outtextxy(0, 404, "");

gotoxy(1, 1);

} void introhistory(void)

/* introhistory shows the history by showing each possible pattern */
/* with an abbreviation indicating the move made in response; the  */
/* text defines the abbreviations, then asks the user to press a key */
/* to continue */

{
int m, n;
int startx = 379; /* define globals that can be used to set */
int starty = 380;  /* startx, starty, and squaresize */
int squaresize = 19;
int width = 240; /* i.e. width across history display */ showhistorysquares(); /* shows the title and squares in history */

/* show example abbreviations */ setcolor(getmaxcolor());

settextstyle(DEFAULT_FONT, HORIZ_DIR, 1);

settextjustify(CENTER_TEXT, CENTER_TEXT);

/* create left viewport for abbreviations */
setviewport(((startx + (3 *  squaresize)), starty, (startx + (width / 2)),
        (starty + (4 * squaresize) + 1), 0);

clearviewport();

for (m = 0; m < 4; m = m + 1)
        {
        if (m == 0)
                outtextxy((((width / 2) - (3 * squaresize)) / 2),
                        ((m * squaresize) + (squaresize / 2)),
                        fwdabbrev);
        if (m == 1)
                outtextxy((((width / 2) - (3 * squaresize)) / 2),
                        ((m * squaresize) + (squaresize / 2)),
                        bkwdabbrev);
        if (m == 2)
                outtextxy((((width / 2) - (3 * squaresize)) / 2),
                        ((m * squaresize) + (squaresize / 2)),
                        clkwseabbrev);
        if (m == 3)
                outtextxy((((width / 2) - (3 * squaresize)) / 2),
                        ((m * squaresize) + (squaresize / 2)),
```

```
                            ctrclkabbrev);
     }

/* create right viewport for abbreviations */
setviewport(((startx + (width / 2) + (3 *  squaresize)), starty,
        (startx + width), (starty + (4 * squaresize) + 1), 0);

clearviewport();

for (m = 0; m < 4; m = m + 1)
    {
    if (m == 0)
            outtextxy((((width / 2) - (3 * squaresize)) / 2),
                     ((m * squaresize) + (squaresize / 2)),
                     nomoveabbrev);
    if (m == 1)
            outtextxy((((width / 2) - (3 * squaresize)) / 2),
                     ((m * squaresize) + (squaresize / 2)),
                     fwdabbrev);
    if (m == 2)
            outtextxy((((width / 2) - (3 * squaresize)) / 2),
                     ((m * squaresize) + (squaresize / 2)),
                     bkwdabbrev);
    if (m == 3)
            outtextxy((((width / 2) - (3 * squaresize)) / 2),
                     ((m * squaresize) + (squaresize / 2)),
                     clkwseabbrev);
    }

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing history */
outtextxy(0, 4, "History holds eight");
outtextxy(0, 20, "moves--one for each");
outtextxy(0, 36, "possible pattern of");
outtextxy(0, 52, "three squares.  The");
outtextxy(0, 68, "abbreviations mean:");
outtextxy(0, 84, "Fwd = ahead one;");
outtextxy(0, 100, "Bkwd = back one;");
outtextxy(0, 116, "Clkwse = clockwise");
outtextxy(0, 132, "turn; Ctrclk =");
outtextxy(0, 148, "counterclockwise");
outtextxy(0, 164, "turn; and Nomove =");
outtextxy(0, 180, "no move stored yet.");
outtextxy(0, 196, "");
outtextxy(0, 212, "A Tabula Rasa message");
outtextxy(0, 228, "tells you History is");
outtextxy(0, 244, "being cleared.");
outtextxy(0, 260, "");
outtextxy(0, 276, "This is the end of");
```

```
outtextxy(0, 292, "the introduction.");
outtextxy(0, 308, "");
outtextxy(0, 324, "Press any key to see");
outtextxy(0, 340, "your options.");
outtextxy(0, 356, "");
outtextxy(0, 372, "");
outtextxy(0, 388, "");
outtextxy(0, 404, "");

gotoxy(1, 1);

} void showhistorysquares(void)

/* showhistorysquares shows the history title, */
/* clears each side of the history viewport, */
/* and then shows the squares for each side; it is called by */
/* introhistory and by dolearn */

{
int m, n;
int startx = 379; /* define globals that can be used to set */
int starty = 380;  /* startx, starty, and squaresize */
int squaresize = 19;
int width = 240; /* i.e. width across history display */
int oncolor = getmaxcolor();
int offcolor = 0;
int floodcolor;
int poly[8];
int onesandtwos[4][2];

setcolor(oncolor);

/* initialize onesandtwos to indicate with a 1 that a square is ON and */
/* with a zero that a square is OFF, in each case only for the two */
/* significant bits */ onesandtwos[0][0] = onesandtwos[0][1] = onesandtwos[1][0] =
        onesandtwos[2][1] = 0;
onesandtwos[1][1] = onesandtwos[2][0] = onesandtwos[3][0] =
        onesandtwos[3][1] = 1;

/* show title of history viewport in the default full-screen viewport */ setviewport(0,0,getmaxx(), getmaxy(), CLIP_ON);

settextstyle(DEFAULT_FONT, HORIZ_DIR, 2);

settextjustify(CENTER_TEXT, CENTER_TEXT);

outtextxy((startx + (width / 2)),
        (starty + (4 * squaresize) + 10), "3:  HISTORY");

setcolor(offcolor);

/* create left history viewport */
setviewport(startx, starty, (startx + (width / 2)),
        (starty + (4 * squaresize) + 1), 0);

clearviewport();

/* draw four rows with three squares each; m indicates the row, */
/* n indicates the square in the row; */
/* each square has a one pixel boundary of medium color */
/* and an interior that is black to indicate OFF or white to */
/* indicate ON */
```

```
for (m = 0; m < 4; m = m + 1)
        {
        for (n = 0; n < 3; n = n + 1)
                {
                if (n == 0)
                        {
                        floodcolor = offcolor;
                        setfillstyle(SOLID_FILL, floodcolor);
                        setcolor(oncolor);

poly[0] = poly[6] = 0;
                        poly[1] = poly[3] = (m * squaresize);
                        poly[2] = poly[4] = (squaresize - 2);
                        poly[5] = poly[7] = (((m + 1) * squaresize) - 2 fillpoly(4, poly);
                        setcolor(offcolor);
                        }
                else
                        {
                        if ((n == 1) || (n == 2))
                        {
                        if (onesandtwos[m][n - 1] == 0)
                                {
                                floodcolor = offcolor;
                                setcolor(oncolor);
                                }
                        if (onesandtwos[m][n - 1] == 1)
                                {
                                floodcolor = oncolor;
                                setcolor(offcolor);
                                }
                        setfillstyle(SOLID_FILL, floodcolor);

poly[0] = poly[6] = (n * squaresize);
                        poly[1] = poly[3] = (m * squaresize);
                        poly[2] = poly[4] = (((n + 1) * squaresize) - 2
                        poly[5] = poly[7] = (((m + 1) * squaresize) - 2 fillpoly(4, poly);
                        setcolor(offcolor);
                        }
                        }
                }
        }

/* create right history viewport */
setviewport(((startx + (width / 2)), starty, (startx + width),
        (starty + (4 * squaresize) + 1), 0);

clearviewport();

/* draw four rows with three squares each; m indicates the row, */
/* n indicates the square in the row; */
/* each square has a one pixel boundary of medium color */
/* and an interior that is black to indicate OFF or white to */
/* indicate ON */ for (m = 0; m < 4; m = m + 1)
        {
        for (n = 0; n < 3; n = n + 1)
                {
                if (n == 0)
                        {
                        floodcolor = oncolor;
                        setfillstyle(SOLID_FILL, floodcolor);
                        setcolor(offcolor);
```

```c
                    poly[0] = poly[6] = 0;
                    poly[1] = poly[3] = (m * squaresize);
                    poly[2] = poly[4] = (squaresize - 2);
                    poly[5] = poly[7] = (((m + 1) * squaresize) - 2);

fillpoly(4, poly);
                    }
            else
                    {
                    if ((n == 1) || (n == 2))
                    {
                    if (onesandtwos[m][n - 1] == 0)
                            {
                            floodcolor = offcolor;
                            setcolor(oncolor);
                            }
                    if (onesandtwos[m][n - 1] == 1)
                            {
                            floodcolor = oncolor;
                            setcolor(offcolor);
                            } setfillstyle(SOLID_FILL, floodcolor);

poly[0] = poly[6] = (n * squaresize);
                    poly[1] = poly[3] = (m * squaresize);
                    poly[2] = poly[4] = (((n + 1) * squaresize) - 2);
                    poly[5] = poly[7] = (((m + 1) * squaresize) - 2);

fillpoly(4, poly);
                    setcolor(offcolor);
                    }
                    }
                    }
            } gotoxy(1, 1); /* cursor to upper left to prevent scrolling */

} void editmaporpattern(void)

/* editmaporpattern displays a character in each square of Map */
/* and Pattern and invites the user to enter a character to */
/* change a square's value */

{
int m, n;
char thischar[3];
char inbuf[10];
char responsechar;
int thisrow, thiscol;
short int stopedit;

stopedit = 1;

showmapwithchars();
showpatternwithchars();
guiflags[0] = guiflags[1] = 1;

while (stopedit != 0)
{   /* begin a while loop that continues until user wants to exit or */
/* stop editing */ gotoxy(1,1); /* puts cursor upper left to prevent scrolling */

/* create text viewport */
setviewport(20, 40, getmaxx()-270, getmaxy()-20, CLIP_ON);
```

```
clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing map */
outtextxy(0, 4, "Here are the Map");
outtextxy(0, 20, "and Pattern with");
outtextxy(0, 36, "current values.");
outtextxy(0, 52, "");
outtextxy(0, 68, "You can change any");
outtextxy(0, 84, "square in Map or");
outtextxy(0, 100, "Pattern from ON");
outtextxy(0, 116, "to OFF or from");
outtextxy(0, 132, "OFF to ON by");
outtextxy(0, 148, "entering the");
outtextxy(0, 164, "character shown in");
outtextxy(0, 180, "the square.");
outtextxy(0, 196, "");
outtextxy(0, 212, "To exit the Game,");
outtextxy(0, 228, "enter X.");
outtextxy(0, 244, "");
outtextxy(0, 260, "To let me search");
outtextxy(0, 276, "this Map for this");
outtextxy(0, 292, "Pattern, enter T.");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

gets(inbuf);
sscanf(inbuf, "%c", &responsechar);

if ((responsechar > 64) && (responsechar < 81))
        {
        thisrow = ((responsechar - 65) / 4);
        thiscol = ((responsechar - 65) % 4);
        if (mapvalues[thisrow][thiscol] == 0)
                mapvalues[thisrow][thiscol] = 1;
        else if (mapvalues[thisrow][thiscol] == 1)
                .mapvalues[thisrow][thiscol] = 0;
        showmapwithchars();
        guiflags[0] = 1;
        } else if ((responsechar > 96) && (responsechar < 113))
        {
        thisrow = ((responsechar - 97) / 4);
        thiscol = ((responsechar - 97) % 4);
        if (mapvalues[thisrow][thiscol] == 0)
```

```c
                    mapvalues[thisrow][thiscol] = 1;
            else if (mapvalues[thisrow][thiscol] == 1)
                    mapvalues[thisrow][thiscol] = 0;
            showmapwithchars();
            guiflags[0] = 1;
            } else if ((responsechar > 80) && (responsechar < 84))
            {
            thiscol = (responsechar - 81);
            if (patternvalues[thiscol] == 0)
                    patternvalues[thiscol] = 1;
            else if (patternvalues[thiscol] == 1)
                    patternvalues[thiscol] = 0;
            showpatternwithchars();
            guiflags[1] = 1;
            } else if ((responsechar > 112) && (responsechar < 116))
            {
            thiscol = (responsechar - 113);
            if (patternvalues[thiscol] == 0)
                    patternvalues[thiscol] = 1;
            else if (patternvalues[thiscol] == 1)
                    patternvalues[thiscol] = 0;
            showpatternwithchars();
            guiflags[1] = 1;
            } else if ((responsechar == 84) || (responsechar == 116))
            {
            stopedit = 0;
            } else if ((responsechar == 88) || (responsechar == 120))
            {
            stopedit = 0;
            exitgame = 0;
            } responsechar = '\0';

} /* end while */ showgui();

} void showmapwithchars(void)

/* showmapwithchars is called by editmaporpattern to display */
/* Map with a character in each square */

{
int m, n;
int startmapx = 379; /* define globals that can be used to set */
int startmapy = 40;  /* startmapx, startmapy, and squaresize */
int squaresize = 60;
int oncolor = getmaxcolor();
int offcolor = 0;
int bordercolor = (getmaxcolor() / 2);
int floodcolor, charcolor;
int poly[8];
char thischar[3];

/* show title of map viewport in the default full-screen viewport */
```

```
setviewport(0,0,getmaxx(), getmaxy(), CLIP_ON);

settextstyle(DEFAULT_FONT, HORIZ_DIR, 2);

settextjustify(CENTER_TEXT, CENTER_TEXT);

outtextxy((startmapx + (2 * squaresize)),
        (startmapy + (4 * squaresize) + 10), "1:  MAP");

/* create map viewport */
setviewport(startmapx, startmapy, getmaxx() - 18,
        (startmapy + (4 * squaresize) + 1), CLIP_ON);

clearviewport();

/* draw the map row by row, m indicating row and n indicating */
/* column; each square has a one pixel boundary of medium color */
/* and an interior that is black to indicate OFF or white to */
/* indicate ON */ for (m = 0; m < 4; m = m + 1)
        {
        for (n = 0; n < 4; n = n + 1)
                {
                setcolor(bordercolor);

thischar[0] = (97 + (m * 4) + n);
                thischar[1] = '\0';

if (mapvalues[m][n] == 0)
                        {
                        floodcolor = offcolor;
                        charcolor = oncolor;
                        setfillstyle(SOLID_FILL, floodcolor);
                        }
                        else if (mapvalues[m][n] == 1)
                        {
                        floodcolor = oncolor;
                        charcolor = offcolor;
                        setfillstyle(SOLID_FILL, floodcolor);
                        } poly[0] = poly[6] = (n * squaresize);
                poly[1] = poly[3] = (m * squaresize);
                poly[2] = poly[4] = ((n + 1) * squaresize);
                poly[5] = poly[7] = ((m + 1) * squaresize);

fillpoly(4, poly);

setcolor(charcolor);

settextjustify(CENTER_TEXT, CENTER_TEXT);
                settextstyle(DEFAULT_FONT, HORIZ_DIR, 4);

outtextxy(((n * squaresize) + (squaresize / 2)),
                        ((m * squaresize) + (squaresize / 2)),
                        thischar);

}
        }
} void showpatternwithchars(void)

/* showpatternwithchars is called by editmaporpattern to display */
/* Pattern with a character in each square */
```

```
{
int m, n;
int squaresize = 60;
int oncolor = getmaxcolor();
int offcolor = 0;
int bordercolor = (getmaxcolor() / 2);
int floodcolor, charcolor;
int poly[8];
char thischar[3];
int startpatternx = 409; /* define globals that can be used to set */
int startpatterny = 300;  /* startpatternx, startpatterny, squaresize */

/* show title of pattern viewport in the default full-screen viewport */ setviewport(0,0,getmaxx(), getmaxy(), CLIP_ON);

settextstyle(DEFAULT_FONT, HORIZ_DIR, 2);

settextjustify(CENTER_TEXT, CENTER_TEXT);

outtextxy((startpatternx + ((3 * squaresize) / 2)),
        (startpatterny + squaresize + 10), "2:   PATTERN");

/* create pattern viewport */
setviewport(startpatternx, startpatterny,
        (startpatternx + (3 * squaresize) + 1),
        (startpatterny + squaresize + 1), CLIP_ON);

clearviewport();

/* draw the pattern with m indicating the square; */
/* each square has a one pixel boundary of medium color */
/* and an interior that is black to indicate OFF or white to */
/* indicate ON */ for (m = 0; m < 3; m = m + 1)
        {
        setcolor(bordercolor);
        thischar[0] = (113 + m);
        thischar[1] = '\0';

if (patternvalues[m] == 0)
                {
                floodcolor = offcolor;
                charcolor = oncolor;
                }
                else
                {
                floodcolor = oncolor;
                charcolor = offcolor;
                } setfillstyle(SOLID_FILL, floodcolor);

poly[0] = poly[6] = (m * squaresize);
        poly[1] = poly[3] = 0;
        poly[2] = poly[4] = (((m + 1) * squaresize) - 1);
        poly[5] = poly[7] = (squaresize - 1);

fillpoly(4, poly);

setcolor(charcolor);

settextjustify(CENTER_TEXT, CENTER_TEXT);
        settextstyle(DEFAULT_FONT, HORIZ_DIR, 4);
```

```c
            outtextxy(((m * squaresize) + (squaresize / 2)),
                     (squaresize / 2),
                     thischar);
        }

} void editmodeorparameters(void)

/* editmodeorparameters displays a text indicating characters */
/* user can enter to change mode or parameters */

{
int m, n;
int floodcolor, charcolor;
int poly[8];
char inbuf[10];
char responsechar;
short int stopedit;
short int firsttime = 1;

stopedit = 1;

gotoxy(1,1); /* puts cursor upper left to prevent scrolling */

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing map */
outtextxy(0, 4, "Before I start, you");
outtextxy(0, 20, "may want to change");
outtextxy(0, 36, "the following by");
outtextxy(0, 52, "entering characters");
outtextxy(0, 68, "as shown.");
outtextxy(0, 84, "");
outtextxy(0, 100, "J:  Mode");
outtextxy(0, 116, "");
outtextxy(0, 132, "");
outtextxy(0, 148, "K:  Sessionmax");
outtextxy(0, 164, "");
outtextxy(0, 180, "L:  Maxnomatch (moves");
outtextxy(0, 196, "before I go random)");
outtextxy(0, 212, "(M:  Inc; N:  Dec)");
outtextxy(0, 228, "");
outtextxy(0, 244, "O:  Randommoves");
outtextxy(0, 260, "(P:  Inc; Q:  Dec)");
outtextxy(0, 276, "");
outtextxy(0, 292, "R:  Tabula Rasa");
outtextxy(0, 308, "");
```

```c
outtextxy(0, 324, "S:  Learninglength");
outtextxy(0, 340, "");
outtextxy(0, 356, "");
outtextxy(0, 372, "Enter T to try a");
outtextxy(0, 388, "search, X to exit");
outtextxy(0, 404, "the Game.");

gotoxy(1, 1);

if (firsttime == 1)
        {
        showdefaultparameters();
        firsttime = 0;
        } while (stopedit != 0)
{  /* begin a while loop that continues until user wants to exit or */
/* stop editing */ gets(inbuf);
sscanf(inbuf, "%c", &responsechar);

if ((responsechar == 74) || (responsechar == 106))
        shiftmode();

else if ((responsechar == 75) || (responsechar == 107))
        shiftsessionmax();

else if ((responsechar == 76) || (responsechar == 108))
        shiftmaxnomatch();

else if ((responsechar == 77) || (responsechar == 109))
        incrementmaxnomatch();

else if ((responsechar == 78) || (responsechar == 110))
        decrementmaxnomatch();

else if ((responsechar == 79) || (responsechar == 111))
        shiftrandommoves();

else if ((responsechar == 80) || (responsechar == 112))
        incrementrandommoves();

else if ((responsechar == 81) || (responsechar == 113))
        decrementrandommoves();

else if ((responsechar == 82) || (responsechar == 114))
        shifttabularasa();

else if ((responsechar == 83) || (responsechar == 115))
        shiftlearninglength();

else if ((responsechar == 84) || (responsechar == 116))
        {
        stopedit = 0;
        } else if ((responsechar == 88) || (responsechar == 120))
        {
        stopedit = 0;
        exitgame = 0;
        } responsechar = '\0';

gotoxy(1, 1);

} /* end while */
```

```c
}
void showdefaultparameters()

/* showdefaultparameters fills in the default parameters in */
/* editmodeorparameters */

{
int thousands, hundreds, tens, ones;
char parameterstring[8];

/* create text viewport */
setviewport(20, 40, getmaxx()-270, getmaxy()-20, CLIP_ON);

setcolor(getmaxcolor());

settextstyle(DEFAULT_FONT, HORIZ_DIR, 2);

settextjustify(LEFT_TEXT, TOP_TEXT);

/* display text describing current mode and default parameters */ if (mode == 1)
        {
        outtextxy(0, 116, "Mode A:   shows moves,");
        outtextxy(0, 132, "does ten searches.");
        }
else if (mode == 2)
        {
        outtextxy(0, 116, "Mode B:  Sessionmax");
        outtextxy(0, 132, "searches, reports.");
        }
else if (mode == 3)
        {
        outtextxy(0, 116, "Mode C:  20,000");
        outtextxy(0, 132, "searches, reports.");
        }
else if (mode == 4)
        {
        outtextxy(0, 116, "Mode D:  to try Maps,");
        outtextxy(0, 132, "Patterns faster.");
        } thousands = (sessionmax / 1000);
hundreds = ((sessionmax - (1000 * thousands)) / 100);
tens = ((sessionmax - ((1000 * thousands) + (100 * hundreds)))/ 10);
ones = (sessionmax - ((1000 * thousands) + (100 * hundreds) +
                (10 * tens)));

parameterstring[0] = thousands + 48;
parameterstring[1] = hundreds + 48;
parameterstring[2] = tens + 48;
parameterstring[3] = ones + 48;
parameterstring[4] = '\0';

outtextxy(0, 164, parameterstring);

tens = (maxnomatch / 10);
ones = (maxnomatch - (10 * tens));

parameterstring[0] = tens + 48;
parameterstring[1] = ones + 48;
parameterstring[2] = '\0';

outtextxy(0, 228, parameterstring);
```

```c
tens = (maxrandommoves / 10);
ones = (maxrandommoves - (10 * tens));

parameterstring[0] = tens + 48;
parameterstring[1] = ones + 48;
parameterstring[2] = '\0';

outtextxy(0, 276, parameterstring);

if (tabularasa == 1)
        outtextxy(0, 308, "ON, I forget it all.");

else if (tabularasa == 0)
                outtextxy(0, 308, "OFF, I remember.");

parameterstring[0] = (learninglength + 48);
parameterstring[1] = '\0';
outtextxy(0, 340, parameterstring);

gotoxy(1, 1);

} void shiftmode(void)

/* shiftmode shifts mode */

{
/* create mode viewport */
setviewport(20, 156, getmaxx()-270, 187, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* change mode and display text describing mode */
if (mode == 4)
        {
        mode = 1;
        outtextxy(0, 0, "Mode A:   shows moves,");
        outtextxy(0, 16, "does ten searches.");
        }
else if (mode == 1)
        {
        mode = 2;
        outtextxy(0, 0, "Mode B:   Sessionmax");
        outtextxy(0, 16, "searches, reports.");
        }
else if (mode == 2)
        {
        mode = 3;
        outtextxy(0, 0, "Mode C:   20,000");
        outtextxy(0, 16, "searches, reports.");
        }
else if (mode == 3)
        {
```

```c
        mode = 4;
        outtextxy(0, 0, "Mode D:  to try Maps,");
        outtextxy(0, 16, "Patterns faster.");
        }
gotoxy(1, 1);

} void shiftsessionmax(void)

/* shiftsessionmax shifts sessionmax */

{
int thousands, hundreds, tens, ones;
char parameterstring[8];

if (sessionmax == 100)
        sessionmax = 200;
else if (sessionmax == 200)
        sessionmax = 400;
else if (sessionmax == 400)
        sessionmax = 800;
else if (sessionmax == 800)
        sessionmax = 1600;
else if (sessionmax == 1600)
        sessionmax = 100;

thousands = (sessionmax / 1000);
hundreds = ((sessionmax - (1000 * thousands)) / 100);
tens = ((sessionmax - ((1000 * thousands) + (100 * hundreds)))/ 10);
ones = (sessionmax - ((1000 * thousands) + (100 * hundreds) +
                  (10 * tens)));

parameterstring[0] = thousands + 48;
parameterstring[1] = hundreds + 48;
parameterstring[2] = tens + 48;
parameterstring[3] = ones + 48;
parameterstring[4] = '\0';

/* create sessionmax viewport */
setviewport(20, 204, getmaxx()-270, 219, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1,1);

} void shiftmaxnomatch(void)

/* shiftmaxnomatch shifts maxnomatch */

{
```

```
int tens, ones;
char parameterstring[8];

if ((maxnomatch >= 10) && (maxnomatch < 20))
        maxnomatch = 20;
else if ((maxnomatch >= 20) && (maxnomatch < 30))
        maxnomatch = 30;
else if ((maxnomatch >= 30) && (maxnomatch < 40))
        maxnomatch = 40;
else if ((maxnomatch >= 40) && (maxnomatch < 60))
        maxnomatch = 60;
else if ((maxnomatch >= 60) && (maxnomatch < 80))
        maxnomatch = 80;
else if ((maxnomatch >= 80) && (maxnomatch < 100))
        maxnomatch = 10;
else if ((maxnomatch > 0) && (maxnomatch < 10))
        maxnomatch = 10;

tens = (maxnomatch / 10);
ones = (maxnomatch - (10 * tens));

parameterstring[0] = tens + 48;
parameterstring[1] = ones + 48;
parameterstring[2] = '\0';

/* create maxnomatch viewport */
setviewport(20, 268, getmaxx()-270, 283, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

} void incrementmaxnomatch(void)

/* incrementmaxnomatch increments maxnomatch */

{
int tens, ones;
char parameterstring[8];

if (maxnomatch < 99)
        maxnomatch = (maxnomatch + 1);
else maxnomatch = 1;

tens = (maxnomatch / 10);
ones = (maxnomatch - (10 * tens));

parameterstring[0] = tens + 48;
parameterstring[1] = ones + 48;
parameterstring[2] = '\0';

/* create maxnomatch viewport */
```

```c
setviewport(20, 268, getmaxx()-270, 283, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

} void decrementmaxnomatch(void)

/* decrementmaxnomatch decrements maxnomatch */

{
int tens, ones;
char parameterstring[8];

if (maxnomatch > 1)
        maxnomatch = (maxnomatch - 1);
else maxnomatch = 99;

tens = (maxnomatch / 10);
ones = (maxnomatch - (10 * tens));

parameterstring[0] = tens + 48;
parameterstring[1] = ones + 48;
parameterstring[2] = '\0';

/* create maxnomatch viewport */
setviewport(20, 268, getmaxx()-270, 283, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

} void shiftrandommoves(void)

/* shiftrandommoves shifts maxrandommoves */
```

```
{
int tens, ones;
char parameterstring[8];

if ((maxrandommoves >= 20) && (maxrandommoves < 40))
        maxrandommoves = 40;
else if ((maxrandommoves >= 40) && (maxrandommoves < 50))
        maxrandommoves = 10;
else if ((maxrandommoves > 0) && (maxrandommoves < 10))
        maxrandommoves = 10;
else if ((maxrandommoves >= 10) && (maxrandommoves < 20))
        maxrandommoves = 20;

tens = (maxrandommoves / 10);
ones = (maxrandommoves - (10 * tens));

parameterstring[0] = tens + 48;
parameterstring[1] = ones + 48;
parameterstring[2] = '\0';

/* create randommoves viewport */
setviewport(20, 316, getmaxx()-270, 331, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

} void incrementrandommoves(void)

/* incrementrandommoves increments maxrandommoves */

{
int tens, ones;
char parameterstring[8];

if (maxrandommoves < 49)
        maxrandommoves = (maxrandommoves + 1);
else maxrandommoves = 1;

tens = (maxrandommoves / 10);
ones = (maxrandommoves - (10 * tens));

parameterstring[0] = tens + 48;
parameterstring[1] = ones + 48;
parameterstring[2] = '\0';

/* create randommoves viewport */
setviewport(20, 316, getmaxx()-270, 331, CLIP_ON);

clearviewport();
```

```c
setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

} void decrementrandommoves(void)

/* decrementrandommoves decrements maxrandommoves */

{
int tens, ones;
char parameterstring[8];

if (maxrandommoves > 1)
        maxrandommoves = (maxrandommoves - 1);
else maxrandommoves = 49;

tens = (maxrandommoves / 10);
ones = (maxrandommoves - (10 * tens));

parameterstring[0] = tens + 48;
parameterstring[1] = ones + 48;
parameterstring[2] = '\0';

/* create randommoves viewport */
setviewport(20, 316, getmaxx()-270, 331, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

} void shifttabularasa(void)

/* shifttabularasa toggles tabularasa */

{
/* create tabularasa viewport */
```

```
setviewport(20, 348, getmaxx()-270, 363, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

if (tabularasa == 0)
        {
        tabularasa = 1;
        outtextxy(0, 0, "ON, I forget it all.");
        }
else if (tabularasa == 1)
        {
        tabularasa = 0;
        outtextxy(0, 0, "OFF, I remember.");
        } gotoxy(1, 1);

} void shiftlearninglength(void)

/* shiftlearninglength shifts learninglength */

{
char parameterstring[8];

if (learninglength < 9)
        learninglength = (learninglength + 1);
else learninglength = 1;

parameterstring[0] = (learninglength + 48);
parameterstring[1] = '\0';

/* create learninglength viewport */
setviewport(20, 380, getmaxx()-270, 395, CLIP_ON);

clearviewport();

setcolor(getmaxcolor());

/* select fill color */
setfillstyle(SOLID_FILL, (getmaxcolor() / 4));

/* fill in bounded region */
floodfill(80, 80, getmaxcolor());

settextstyle(DEFAULT_FONT, HORIZ_DIR, 2);

settextjustify(LEFT_TEXT, TOP_TEXT);

outtextxy(0, 0, parameterstring);

gotoxy(1, 1);

}
```

```c
void learnforgame(void)

/* learnforgame handles learning during the game, and is similar to */
/* dolearn in many ways */

{
int stepcount = 0;
char responsechar;
char inbuf[10];
short int stop = 1;
int successcount, maxtotalmoves;
short int stepsum = 0;
int showcount = 0;
int updateno, resultsno;
int resultsmagnitude;
int maxstepno = 0;
int elapsedmsecs, msecsremain;
clock_t start, end;

maxtotalmoves = (maxnomatch + maxrandommoves);

/* initialize history if tabula rasa is requested */ showhistorysquares();
if (tabularasa == 1)
        {
        inithistory();
        showtabularasatext();
        delay(3000);
        showgui();
        }

/* then use mode to initialize resultsno and updateno */ if (mode == 1)
        {
        resultsno = 10;
        updateno = 1;
        }
else if (mode == 2)
        {
        resultsno = sessionmax;
        updateno = 0;
        }
else if ((mode == 3) || (mode == 4))
        {
        resultsno = maxsearches;
        updateno = 0;
        }
else    /* default is same as Mode A */
        {
        resultsno = 10;
        updateno = 1;
        mode = 1;
        }

/* then, initialize stack */ createstack();

/* then begin a loop that continues until user presses X to exit */ while (stop != 0)
{ /* start outer while loop */ showlearnstartoptions();

/* get user's response-- if an A, use mode A; if a B use */
```

```c
/* mode B; if a C, use mode C; if a D, use mode D; */
/* if anything else, use current mode */ gets(inbuf);
sscanf(inbuf, "%c", &responsechar);
if ((responsechar == 65) || (responsechar == 97))
        /* large or small "A" */
        {
        resultsno = 10;
        updateno = 1;
        mode = 1;
        }
        else if ((responsechar == 66) || (responsechar == 98))
        /* large or small "B" */
        {
        resultsno = sessionmax;
        updateno = 0;
        mode = 2;
        }
        else if ((responsechar == 67) || (responsechar == 99))
        /* large or small "C" */
        {
        resultsno = maxsearches;
        updateno = 0;
        mode = 3;
        }
        else if ((responsechar == 68) || (responsechar == 100))
        /* large or small "D" */
        {
        resultsno = maxsearches;
        updateno = 0;
        mode = 4;
        } responsechar = '\0';

sincerandommove = 0;
gotrandommove = 0;

/* now start learning with the current value of resultsno */ for (successcount = 0; successcount < resultsno;
        successcount++)
{ /* start for loop */ if (sincerandommove < stableno)

{ /* start if--else sets successcount to short circuit session */ showcount = 0;

match = 1;
while (match == 1)
{
startposition();
patternmatch();
} /* never start on pattern, never learn a move */
/* for pattern */ if (updateno != 0)
        {
        showstartingposition();
        gets(inbuf);
        sscanf(inbuf, "%c", &responsechar);
        if ((responsechar == 88) || (responsechar == 120))
                /* large or small "X" */
                {
                stop = 0;
```

```c
                stepsum = maxtotalmoves; /* shortcircuits if */
                successcount = resultsno; /* and for loop */
                match = 2; /* and while loop */
                stepcount = maxtotalmoves; /* and another while loop */
                }
                else
                {
                start = clock();
                }
        responsechar = '\0';
        }
if (stop != 0)
        {
        stepcount = cyclecount = 0;
        stacklocation = stackstart = 0;
        stepstack[stacklocation][0] =
                stepstack[stacklocation][1] =
                stepstack[stacklocation][2] = 2;
        } while ((match != 1) && (stepcount < maxtotalmoves))

{ /* begin inner while loop */
        getlearningmove();
        abconstack();
        moveintemp();
        donextstep();
        patternmatch();

if ((thislocpattern[0] == lastlocpattern[0]) &&
                (thislocpattern[1] == lastlocpattern[1]) &&
                (thislocpattern[2] == lastlocpattern[2]))
                {
                repeatcount++;
                }
                else repeatcount = 0;

if ((updateno != 0) && (match != 1))
        {
        showcount++;
        if (showcount >= updateno)
                {
                convertarray();
                showmove();
                showcount = 0;
                if (start != -1)
                {
                end = clock();
                elapsedmsecs = ((1000 * (end - start)) / CLK_TCK);
                msecsremain = ((speed * 10) - elapsedmsecs);
                if ((elapsedmsecs < (speed * 10)) &&
                        (msecsremain < 5000) &&
                        (msecsremain > 100))
                        delay(msecsremain);
                printf("\a");
                start = clock();
                }

}

} /* end outer if */ cyclecount++;
        stepcount++;
        } /* end inner while loop */ if (stepcount > maxstepno)
        maxstepno = stepcount;
```

```c
if ((updateno != 0) && (stop != 0))
        { /* begin outer if */
        convertarray();
        showmove();
        if (start != -1)
                {
                end = clock();
                /* could insert a delay here before beep, but */
                /* quick beep may suggest snapping into place */
                printf("\a");
                delay(1500);
                start = clock();
                }

} /* end outer if */ stepsum = stepsum + stepcount;
if (match == 1)
        {
        learningresponse();
        guiflags[2] = 1;
        }
stepcount = 0;
resultlearncount = (successcount + 1);
match = 2; /* reinitializes match for patternmatch */
if (sincerandommove <= stableno)
        sincerandommove++;
if (gotrandommove == 1)
        sincerandommove = 0;
gotrandommove = 0;

} /* end if */
else
{
resultlearncount = (successcount + 1);
successcount = resultsno;
}

} /* end of for loop */ resultstepmax = maxstepno;
resultstepaverage = (stepsum / resultlearncount);

if ((stop != 0) && (mode != 4))
        {
        showgui();
        showgameresults();

gets(inbuf);
        sscanf(inbuf, "%c", &responsechar);
        if ((responsechar == 88) || (responsechar == 120))
                /* large or small "X" */
                {
                stop = 0;
                exitgame = 1;
                }
        else if ((responsechar == 84) || (responsechar == 116))
                /* large or small "T" */
                {
                stop = 0;
                } responsechar = '\0';

}
else if ((stop != 0) && (mode == 4))
        {
```

```c
            showgui();
            showmodedresults();

gets(inbuf);
            sscanf(inbuf, "%c", &responsechar);
            if ((responsechar == 88) || (responsechar == 120))
                    /* large or small "X" */
                    {
                    stop = 0;
                    }
            else if ((responsechar == 69) || (responsechar == 101))
                    /* large or small "E" */
                    {
                    editmaporpattern();
                    } responsechar = '\0';

} stepsum = 0;
maxstepno = 0;

}  /* end outer while loop */

} void showoptions(void)

/* showoptions presents the standard options in the text */
/* window, and the response is handled in guiscreen; the */
/* options included are Search, Learn, Quit, Help, or Game */

{
gotoxy(1,1); /* puts cursor upper left to prevent scrolling */

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
floodfill(80, 80, getmaxcolor());

settextstyle(DEFAULT_FONT, HORIZ_DIR, 2);

settextjustify(LEFT_TEXT, TOP_TEXT);

/* display text describing map */
outtextxy(0, 4, "To play a game");
outtextxy(0, 20, "to stump the");
outtextxy(0, 36, "Pattern Witch,");
outtextxy(0, 52, "enter G. (game)");
outtextxy(0, 68, "");
outtextxy(0, 84, "For an introduction,");
outtextxy(0, 100, "enter H. (help)");
outtextxy(0, 116, "");
outtextxy(0, 132, "To stop, enter Q.");
```

```c
outtextxy(0, 148, "(quit)");
outtextxy(0, 164, "");
outtextxy(0, 180, "To see how I search,");
outtextxy(0, 196, "enter S.  (search)");
outtextxy(0, 212, "");
outtextxy(0, 228, "To see how I learn,");
outtextxy(0, 244, "enter some other");
outtextxy(0, 260, "key.  (not G, H,");
outtextxy(0, 276, "Q, or S)");
outtextxy(0, 292, "");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void showintroexit(void)

/* showintroexit is called by intromap and intropattern and */
/* gives the user the option to exit or continue with the */
/* rest of guiintro */

{
/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "To escape from the");
outtextxy(0, 20, "introduction, enter");
outtextxy(0, 36, "X (exit).");
outtextxy(0, 52, "");
outtextxy(0, 68, "To continue with");
outtextxy(0, 84, "the introduction,");
outtextxy(0, 100, "enter some other ");
outtextxy(0, 116, "key.  (not X)");
outtextxy(0, 132, "");
outtextxy(0, 148, "");
outtextxy(0, 164, "");
outtextxy(0, 180, "");
outtextxy(0, 196, "");
outtextxy(0, 212, "");
outtextxy(0, 228, "");
outtextxy(0, 244, "");
outtextxy(0, 260, "");
```

```
outtextxy(0, 276, "");
outtextxy(0, 292, "");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void shownewmap(void)

/* shownewmap is called by showgui to display a changed map */

{
int m, n;
int startx = 379;  /* define globals that can be used to set */
int starty = 40;   /* startx, starty, and squaresize */
int squaresize = 60;
int oncolor = getmaxcolor();
int offcolor = 0;
int bordercolor = (getmaxcolor() / 2);
int floodcolor;
int poly[8];
int frontposition[2], midposition[2], rearposition[2];
char frontchar[10], midchar[10], rearchar[10];

/* set up frontchar, midchar, and rearchar */ if (currentloc[2] == 0)
        {
        frontchar[0] = 17;
        rearchar[0] = 27;
        }
        else if (currentloc[2] == 1)
        {
        frontchar[0] = 30;
        rearchar[0] = 24;
        }
        else if (currentloc[2] == 2)
        {
        frontchar[0] = 16;
        rearchar[0] = 26;
        }
        else if (currentloc[2] == 3)
        {
        frontchar[0] = 31;
        rearchar[0] = 25;
        } frontchar[1] = rearchar[1] = '\0';

midchar[0] = 9;
midchar[1] = '\0';

/* show title of map viewport in the default full-screen viewport */ setviewport(0,0,getmaxx(), getmaxy(), CLIP_ON);

settextstyle(DEFAULT_FONT, HORIZ_DIR, 2);

settextjustify(CENTER_TEXT, CENTER_TEXT);
```

```
outtextxy((startx + (2 * squaresize)),
          (starty + (4 * squaresize) + 10), "1:  MAP");

/* initialize frontposition to be outside map */ frontposition[0] = midposition[0] = rearposition[0] = 4;
frontposition[1] = midposition[1] = rearposition[1] = 4;

/* create map viewport */
setviewport(startx, 40, getmaxx()-18,
          (starty + (4 * squaresize) + 1), CLIP_ON);

clearviewport();

/* draw the map row by row, m indicating row and n indicating */
/* column; each square has a one pixel boundary of medium color */
/* and an interior that is black to indicate OFF or white to */
/* indicate ON */ for (m = 0; m < 4; m = m + 1)
        {
        for (n = 0; n < 4; n = n + 1)
                {
                setcolor(bordercolor);

if (convertedmap[m][n] == 0)
                        {
                        floodcolor = offcolor;
                        setfillstyle(SOLID_FILL, floodcolor);
                        }
                else if (convertedmap[m][n] == 1)
                        {
                        floodcolor = oncolor;
                        setfillstyle(SOLID_FILL, floodcolor);
                        }
                else if (convertedmap[m][n] == 2)
                        {
                        frontposition[0] = m;
                        frontposition[1] = n;
                        floodcolor = oncolor;
                        setfillstyle(WIDE_DOT_FILL, floodcolor);
                        }
                else if (convertedmap[m][n] == 3)
                        {
                        frontposition[0] = m;
                        frontposition[1] = n;
                        floodcolor = oncolor;
                        setfillstyle(HATCH_FILL, floodcolor);
                        }
                else if (convertedmap[m][n] == 4)
                        {
                        midposition[0] = m;
                        midposition[1] = n;
                        floodcolor = oncolor;
                        setfillstyle(WIDE_DOT_FILL, floodcolor);
                        }
                else if (convertedmap[m][n] == 5)
                        {
                        midposition[0] = m;
                        midposition[1] = n;
                        floodcolor = oncolor;
                        setfillstyle(HATCH_FILL, floodcolor);
                        }
                else if (convertedmap[m][n] == 6)
                        {
                        rearposition[0] = m;
                        rearposition[1] = n;
```

```
                    floodcolor = oncolor;
                    setfillstyle(WIDE_DOT_FILL, floodcolor);
                    }
                    else if (convertedmap[m][n] == 7)
                    {
                    rearposition[0] = m;
                    rearposition[1] = n;
                    floodcolor = oncolor;
                    setfillstyle(HATCH_FILL, floodcolor);
                    } poly[0] = poly[6] = (n * squaresize);
            poly[1] = poly[3] = (m * squaresize);
            poly[2] = poly[4] = ((n + 1) * squaresize);
            poly[5] = poly[7] = ((m + 1) * squaresize);

fillpoly(4, poly);
            }
        }

/* put an arrow in front pointing toward the front, a circle in */
/* the middle, and a tail-like arrow at the rear position */
/* if frontposition is not at its initialized position outside map  * if ((frontposition[0] != 4) && (frontposition[1] != 4))
{
setcolor(oncolor);

settextjustify(CENTER_TEXT, CENTER_TEXT);
settextstyle(DEFAULT_FONT, HORIZ_DIR, 6);

outtextxy(((frontposition[1] * squaresize) + (squaresize / 2)),
        ((frontposition[0] * squaresize) + (squaresize / 2)),
        frontchar);
outtextxy(((midposition[1] * squaresize) + (squaresize / 2)),
        ((midposition[0] * squaresize) + (squaresize / 2)),
        midchar);
outtextxy(((rearposition[1] * squaresize) + (squaresize / 2)),
        ((rearposition[0] * squaresize) + (squaresize / 2)),
        rearchar);

}
} void showmove(void)

/* showmove is called to show a move without repainting map */

{
int startx = 379; /* define globals that can be used to set */
int starty = 40;  /* startx, starty, and squaresize */
int squaresize = 60;
int oncolor = getmaxcolor();
int offcolor = 0;
int bordercolor = (getmaxcolor() / 2);
int floodcolor;
int poly[8];
char frontchar[10];
short int newposition = 0;
char midchar[10], rearchar[10];
short int painta = 0, paintb = 0, paintc = 0;

/* set up frontchar and midchar */ if (currentloc[2] == 0)
        {
```

```
                frontchar[0] = 17;
                rearchar[0] = 27;
                }
                else if (currentloc[2] == 1)
                {
                frontchar[0] = 30;
                rearchar[0] = 24;
                }
                else if (currentloc[2] == 2)
                {
                frontchar[0] = 16;
                rearchar[0] = 26;
                }
                else if (currentloc[2] == 3)
                {
                frontchar[0] = 31;
                rearchar[0] = 25;
                } frontchar[1] = rearchar[1] = '\0';

midchar[0] = 9;
midchar[1] = '\0';

/* new position? */ if ((thisabc[0] != lastabc[0]) || (thisabc[1] != lastabc[1]))
        newposition = 1;

/* redraw each position as necessary */
/* each square has a one pixel boundary of medium color */
/* and an interior that includes an arrow for a and c and a circle */
/* for b */ if (newposition == 1)
        {
        /* first create, clear viewport for old position of a */
        setviewport((startx + (lastabc[1] * squaresize)),
                (starty + (lastabc[0] * squaresize)),
                (startx + ((lastabc[1] + 1) * squaresize)),
                (starty + ((lastabc[0] + 1) * squaresize)), CLIP_ON);

clearviewport();

setcolor(bordercolor);

if (convertedmap[lastabc[0]][lastabc[1]] == 0)
                {
                floodcolor = offcolor;
                setfillstyle(SOLID_FILL, floodcolor);
                }
                else if (convertedmap[lastabc[0]][lastabc[1]] == 1)
                {
                floodcolor = oncolor;
                setfillstyle(SOLID_FILL, floodcolor);
                }
                else if (convertedmap[lastabc[0]][lastabc[1]] == 4)
                {
                paintb = 1;
                floodcolor = oncolor;
                setfillstyle(WIDE_DOT_FILL, floodcolor);
                }
                else if (convertedmap[lastabc[0]][lastabc[1]] == 5)
                {
                paintb = 1;
                floodcolor = oncolor;
                setfillstyle(HATCH_FILL, floodcolor);
                }
```

```
        poly[0] = poly[6] = 0;
        poly[1] = poly[3] = 0;
        poly[2] = poly[4] = squaresize;
        poly[5] = poly[7] = squaresize;

fillpoly(4, poly);

if (paintb == 1)
                {
                setcolor(oncolor);

settextjustify(CENTER_TEXT, CENTER_TEXT);
                settextstyle(DEFAULT_FONT, HORIZ_DIR, 6);

outtextxy((squaresize / 2), (squaresize / 2),
                        midchar);
                }
        paintb = 0;  /* clear paintb for subsequent reuse */

/* then create, clear viewport for new position of a */
        setviewport((startx + (thisabc[1] * squaresize)),
                (starty + (thisabc[0] * squaresize)),
                (startx + ((thisabc[1] + 1) * squaresize)),
                (starty + ((thisabc[0] + 1) * squaresize)), CLIP_ON);

clearviewport();

setcolor(bordercolor);

if (convertedmap[thisabc[0]][thisabc[1]] == 2)
                {
                painta = 1;
                floodcolor = oncolor;
                setfillstyle(WIDE_DOT_FILL, floodcolor);
                }
                else if (convertedmap[thisabc[0]][thisabc[1]] == 3)
                {
                painta = 1;
                floodcolor = oncolor;
                setfillstyle(HATCH_FILL, floodcolor);
                } poly[0] = poly[6] = 0;
        poly[1] = poly[3] = 0;
        poly[2] = poly[4] = squaresize;
        poly[5] = poly[7] = squaresize;

fillpoly(4, poly);

if (painta == 1)
                {
                setcolor(oncolor);

settextjustify(CENTER_TEXT, CENTER_TEXT);
                settextstyle(DEFAULT_FONT, HORIZ_DIR, 6);

outtextxy((squaresize / 2), (squaresize / 2),
                        frontchar);
                }

/* then create, clear viewport for old position of c */
        setviewport((startx + (lastabc[5] * squaresize)),
                (starty + (lastabc[4] * squaresize)),
                (startx + ((lastabc[5] + 1) * squaresize)),
                (starty + ((lastabc[4] + 1) * squaresize)), CLIP_ON);
```

```
clearviewport();

setcolor(bordercolor);

if (convertedmap[lastabc[4]][lastabc[5]] == 0)
        {
        floodcolor = offcolor;
        setfillstyle(SOLID_FILL, floodcolor);
        }
        else if (convertedmap[lastabc[4]][lastabc[5]] == 1)
        {
        floodcolor = oncolor;
        setfillstyle(SOLID_FILL, floodcolor);
        }
        else if (convertedmap[lastabc[4]][lastabc[5]] == 4)
        {
        paintb = 1;
        floodcolor = oncolor;
        setfillstyle(WIDE_DOT_FILL, floodcolor);
        }
        else if (convertedmap[lastabc[4]][lastabc[5]] == 5)
        {
        paintb = 1;
        floodcolor = oncolor;
        setfillstyle(HATCH_FILL, floodcolor);
        } poly[0] = poly[6] = 0;
poly[1] = poly[3] = 0;
poly[2] = poly[4] = squaresize;
poly[5] = poly[7] = squaresize;

fillpoly(4, poly);

if (paintb == 1)
        {
        setcolor(oncolor);

settextjustify(CENTER_TEXT, CENTER_TEXT);
        settextstyle(DEFAULT_FONT, HORIZ_DIR, 6);

outtextxy((squaresize / 2), (squaresize / 2),
                midchar);
        }

/* then create, clear viewport for new position of c */
setviewport((startx + (thisabc[5] * squaresize)),
        (starty + (thisabc[4] * squaresize)),
        (startx + ((thisabc[5] + 1) * squaresize)),
        (starty + ((thisabc[4] + 1) * squaresize)), CLIP_ON);

clearviewport();

setcolor(bordercolor);

if (convertedmap[thisabc[4]][thisabc[5]] == 6)
        {
        paintc = 1;
        floodcolor = oncolor;
        setfillstyle(WIDE_DOT_FILL, floodcolor);
        }
        else if (convertedmap[thisabc[4]][thisabc[5]] == 7)
        {
        paintc = 1;
        floodcolor = oncolor;
        setfillstyle(HATCH_FILL, floodcolor);
        }
```

```
                poly[0] = poly[6] = 0;
                poly[1] = poly[3] = 0;
                poly[2] = poly[4] = squaresize;
                poly[5] = poly[7] = squaresize;

fillpoly(4, poly);

if (paintc == 1)
                        {
                        setcolor(oncolor);

settextjustify(CENTER_TEXT, CENTER_TEXT);
                        settextstyle(DEFAULT_FONT, HORIZ_DIR, 6);

outtextxy((squaresize / 2), (squaresize / 2),
                                rearchar);
                        }
                }

} void shownewpattern(void)

/* shownewpattern is called by showgui to display a changed pattern */

{
int m;
int startx = 409; /* define globals that can be used to set */
int starty = 300;  /* startx, starty, and squaresize */
int squaresize = 60;
int oncolor = getmaxcolor();
int offcolor = 0;
int bordercolor = (getmaxcolor() / 2);
int floodcolor;
int poly[8];

/* show title of pattern viewport in the default full-screen viewport setviewport(0,0,getmaxx(), getmaxy(), CLIP_ON);

settextstyle(DEFAULT_FONT, HORIZ_DIR, 2);

settextjustify(CENTER_TEXT, CENTER_TEXT);

outtextxy((startx + ((3 * squaresize) / 2)),
        (starty + squaresize + 10), "2:  PATTERN");

/* create pattern viewport */
setviewport(startx, starty, (startx + (3 * squaresize) + 1),
        (starty + squaresize + 1), CLIP_ON);

clearviewport();

/* draw the pattern with m indicating the square; */
/* each square has a one pixel boundary of medium color */
/* and an interior that is black to indicate OFF or white to */
/* indicate ON */ for (m = 0; m < 3; m = m + 1)
        {
        setcolor(bordercolor);
        if (patternvalues[m] == 0)
                {
                floodcolor = offcolor;
                }
                else floodcolor = oncolor;
```

```c
        setfillstyle(SOLID_FILL, floodcolor);

poly[0] = poly[6] = (m * squaresize);
        poly[1] = poly[3] = 0;
        poly[2] = poly[4] = (((m + 1) * squaresize) - 1);
        poly[5] = poly[7] = (squaresize - 1);

fillpoly(4, poly);
        }

} void shownewhistory(void)

/* shownewhistory is called by showgui to display a new history */

{
int m, n;
int startx = 379; /* define globals that can be used to set */
int starty = 380;  /* startx, starty, and squaresize */
int squaresize = 19;
int width = 240; /* i.e. width across history display */
int movevalue;
int movertwo, mmodtwo;

/* insert the abbreviations */ setcolor(getmaxcolor());

settextstyle(DEFAULT_FONT, HORIZ_DIR, 1);

settextjustify(CENTER_TEXT, CENTER_TEXT);

/* create left viewport */
setviewport((startx + (3 * squaresize)), starty,
        (startx + (width / 2)), (starty + (4 * squaresize) + 1), 0);

clearviewport();

/* insert the appropriate move abbreviation next to each row */ for (m = 0; m < 4; m = m + 1)
        {
        movertwo = (m / 2);
        mmodtwo = (m % 2);
        movevalue = history[0][movertwo][mmodtwo][1];
        if (movevalue == 0)
                outtextxy((((width / 2) - (3 * squaresize)) / 2),
                        ((m * squaresize) + (squaresize / 2)),
                        nomoveabbrev);
        if (movevalue == 1)
                outtextxy((((width / 2) - (3 * squaresize)) / 2),
                        ((m * squaresize) + (squaresize / 2)),
                        bkwdabbrev);
        if (movevalue == 2)
                outtextxy((((width / 2) - (3 * squaresize)) / 2),
                        ((m * squaresize) + (squaresize / 2)),
                        fwdabbrev);
        if (movevalue == 3)
                outtextxy((((width / 2) - (3 * squaresize)) / 2),
                        ((m * squaresize) + (squaresize / 2)),
                        clkwseabbrev);
        if (movevalue == 4)
                outtextxy((((width / 2) - (3 * squaresize)) / 2),
                        ((m * squaresize) + (squaresize / 2)),
                        ctrclkabbrev);

}
```

```c
/* create right viewport */
setviewport(((startx + (width / 2) + (3 * squaresize)), starty,
        (startx + width), (starty + (4 * squaresize) + 1), 0);

clearviewport();

/* insert the appropriate move abbreviation next to each row */
for (m = 0; m < 4; m = m + 1)
        {
        movertwo = (m / 2);
        mmodtwo = (m % 2);
        movevalue = history[1][movertwo][mmodtwo][1];
        if (movevalue == 0)
                outtextxy((((width / 2) - (3 * squaresize)) / 2),
                        ((m * squaresize) + (squaresize / 2)),
                        nomoveabbrev);
        if (movevalue == 1)
                outtextxy((((width / 2) - (3 * squaresize)) / 2),
                        ((m * squaresize) + (squaresize / 2)),
                        bkwdabbrev);
        if (movevalue == 2)
                outtextxy((((width / 2) - (3 * squaresize)) / 2),
                        ((m * squaresize) + (squaresize / 2)),
                        fwdabbrev);
        if (movevalue == 3)
                outtextxy((((width / 2) - (3 * squaresize)) / 2),
                        ((m * squaresize) + (squaresize / 2)),
                        clkwseabbrev);
        if (movevalue == 4)
                outtextxy((((width / 2) - (3 * squaresize)) / 2),
                        ((m * squaresize) + (squaresize / 2)),
                        ctrclkabbrev);

}

} void startposition(void)

/* startposition randomly selects a starting position in maparray; */
/* it does so by first obtaining a random number indicating row, then */
/* another indicating column, and then another indicating direction */

{
getquadran();
currentloc[0] = quadranno;
getquadran();
currentloc[1] = quadranno;
getquadran();
currentloc[2] = quadranno;
} void getquadran(void)

/* calls getranno to get a random number, then converts it to a quadno

{
getranno();
if (ranno == MAXRANNO)
        {
        printf("Invalid random number in getquadran.\n");
        quadranno = 4;
        }
        else
        {
                if (ranno >= (3 * (MAXRANNO/4)))
                        quadranno = 3;
```

```
                else
                {
                if (ranno >= (2 * (MAXRANNO/4)))
                        quadranno = 2;
                        else
                        {
                        if (ranno >= (MAXRANNO/4))
                        quadranno = 1;
                        else quadranno = 0;
                        }
                }
        }
} void getranno(void)

/* Each time getranno is called, it generates a random number in the range
/* zero to MAXRANNO-1.  Then,it sets ranno to the generated number. */

{
ranno = random(MAXRANNO);
} void convertarray(void)

/* convertarray uses the current position to obtain convertedmap, */
/* a version of maparray in which the position currentloc is */
/* indicated by letters a, b, c in parentheses */

{
int m,n;
short int homerow = currentloc[0], homecol = currentloc[1];
short int direction = currentloc[2];
short int arow, crow, acol, ccol;

if (homerow > 3)    /* the test for no position in map */
{
/* just copy maparray into convertedmap */ for (m = 0; m < VERT; m = m + 1)
        {
        for (n = 0; n < HORIZ; n = n + 1)
                convertedmap[m][n] = mapvalues[m][n];
        }
}
else
{

/* first copy maparray into convertedmap */ or (m = 0; m < VERT; m = m + 1)
        {
        for (n = 0; n < HORIZ; n = n + 1)
                convertedmap[m][n] = mapvalues[m][n];
        }

/* then change the center value at currentloc */
convertedmap[homerow][homecol] = (convertedmap[homerow][homecol] + 4);

/* then find the adjacent locations based on direction */ switch (direction)
        {
        case 0 :
                {
                arow = crow = homerow;
                if (homecol != 0)
                        acol = (homecol - 1);
```

```
                                else acol = 3;
                        if (homecol != 3)
                                ccol = (homecol + 1);
                                else ccol = 0;
                        break;
                        }
                case 1 :
                        {
                        acol = ccol = homecol;
                        if (homerow != 0)
                                arow = (homerow - 1);
                                else arow = 3;
                        if (homerow != 3)
                                crow = (homerow + 1);
                                else crow = 0;
                        break;
                        }
                case 2 :
                        {
                        arow = crow = homerow;
                        if (homecol != 3)
                                acol = (homecol + 1);
                                else acol = 0;
                        if (homecol != 0)
                                ccol = (homecol - 1);
                                else ccol = 3;
                        break;
                        }
                case 3 :
                        {
                        acol = ccol = homecol;
                        if (homerow != 3)
                                arow = (homerow + 1);
                                else arow = 0;
                        if (homerow != 0)
                                crow = (homerow - 1);
                                else crow = 3;
                        break;
                        }
                default : printf("Bad direction in convertarray.\n");
                } convertedmap[arow][acol] = (convertedmap[arow][acol] + 2);
convertedmap[crow][ccol] = (convertedmap[crow][ccol] + 6);

/* set lastabc to thisabc and set thisabc to arow, acol, */
/* homerow, homecol, crow, ccol */ lastabc[0] = thisabc[0];
lastabc[1] = thisabc[1];
lastabc[2] = thisabc[2];
lastabc[3] = thisabc[3];
lastabc[4] = thisabc[4];
lastabc[5] = thisabc[5];

thisabc[0] = arow;
thisabc[1] = acol;
thisabc[2] = homerow;
thisabc[3] = homecol;
thisabc[4] = crow;
thisabc[5] = ccol;

}

} void donextstep(void)
```

```c
/* donextstep starts at currentloc and performs currentmove */
/* so that currentloc has a new value and currentmove = 0 */

{
short int startrow = currentloc[0], startcol = currentloc[1];
short int startdir = currentloc[2];
short int newrow, newcol, newdir;

switch (currentmove)
    {
    case 0 : printf("No move in donextstep.\n"); break;
    case 1 : {
        newdir = startdir;
        switch (startdir)
            {
            case 0 : newrow = startrow;
                    if (startcol != 3)
                            newcol = (startcol + 1);
                    else newcol = 0; break;
            case 1 : newcol = startcol;
                    if (startrow != 3)
                            newrow = (startrow + 1);
                    else newrow = 0; break;
            case 2 : newrow = startrow;
                    if (startcol != 0)
                            newcol = (startcol - 1);
                    else newcol = 3; break;
            case 3 : newcol = startcol;
                    if (startrow != 0)
                            newrow = (startrow - 1);
                    else newrow = 3; break;
            default : printf("Bad direction in donextstep1.\n");
            }
        break;
        }
    case 2 : {
        newdir = startdir;
        switch (startdir)
            {
            case 0 : newrow = startrow;
                    if (startcol != 0)
                            newcol = (startcol - 1);
                    else newcol = 3; break;
            case 1 : newcol = startcol;
                    if (startrow != 0)
                            newrow = (startrow - 1);
                    else newrow = 3; break;
            case 2 : newrow = startrow;
                    if (startcol != 3)
                            newcol = (startcol + 1);
                    else newcol = 0; break;
            case 3 : newcol = startcol;
                    if (startrow != 3)
                            newrow = (startrow + 1);
                    else newrow = 0; break;
            default : printf("Bad direction in donextstep.\n");
            }
        break;
        }
    case 3 : newrow = startrow;
            newcol =startcol;
            if (startdir != 3)
                    newdir = (startdir + 1);
                    else newdir = 0;
            break;
    case 4 : newrow = startrow;
            newcol =startcol;
```

```
                        if (startdir != 0)
                                newdir = (startdir - 1);
                        else newdir = 3;
                break;
        default : printf("Invalid move in donextstep.\n");
        }
currentloc[0] = newrow;
currentloc[1] = newcol;
currentloc[2] = newdir;

currentmove = 0;

} void patternmatch(void)

/* patternmatch checks whether the values at currentloc match patter
/* and sets match to 0 if they don't, 1 if they do */

{
char inbuf[10];
char yesorno;
short int thisrow = currentloc[0];
short int thiscol = currentloc[1];
short int thisdir = currentloc[2];
short int arow, acol, crow, ccol, aval, cval;
short int goodsofar = 1;

if (mapvalues[thisrow][thiscol] != patternvalues[1])
        goodsofar = 0;
switch (thisdir)
        {
        case 0 : arow = crow = thisrow;
                if (thiscol != 0)
                        acol = (thiscol - 1);
                        else acol = 3;
                if (thiscol != 3)
                        ccol = (thiscol + 1);
                        else ccol = 0;
                break;
        case 1 : acol = ccol = thiscol;
                if (thisrow != 0)
                        arow = (thisrow - 1);
                        else arow = 3;
                if (thisrow != 3)
                        crow = (thisrow + 1);
                        else crow = 0;
                break;
        case 2 : arow = crow = thisrow;
                if (thiscol != 3)
                        acol = (thiscol + 1);
                        else acol = 0;
                if (thiscol != 0)
                        ccol = (thiscol - 1);
                        else ccol = 3;
                break;
        case 3 : acol = ccol = thiscol;
                if (thisrow != 3)
                        arow = (thisrow + 1);
                        else arow = 0;
                if (thisrow != 0)
                        crow = (thisrow - 1);
                        else crow = 3;
                break;
        default : printf("Bad direction in patternmatch.\n")
        }
```

```c
lastlocpattern[0] = thislocpattern[0];
lastlocpattern[1] = thislocpattern[1];
lastlocpattern[2] = thislocpattern[2];

thislocpattern[0] = mapvalues[arow][acol];
thislocpattern[1] = mapvalues[thisrow][thiscol];
thislocpattern[2] = mapvalues[crow][ccol];

if (thislocpattern[0] != patternvalues[0])
        goodsofar = 0;
if (thislocpattern[2] != patternvalues[2])
        goodsofar = 0;

match = goodsofar;

} void inithistory(void)

/* inithistory initializes history to all zeroes */

{
int m, n, p;

for (m = 0; m < 2; m = m+1)
        {
        for (n = 0; n < 2; n = n+1)
                {
                for (p = 0; p < 2; p = p+1)
                        {
                        history[m][n][p][0] = history[m][n][p][1] = 0;
                        }
                }
        } guiflags[2] = 1;

} void createstack(void)

/* createstack initializes stepstack so that each step has 2, 2, 2 */

{
int m;

for (m = 0; m < STACKLENGTH; m = m+1)
        {
        stepstack[m][0] = stepstack[m][1] = stepstack[m][2] = 2;
        }
} void getlearningmove(void)

/* getlearningmove decides whether to get a stored move or a random move */
/* first it checks whether a move is stored for a, b, c in history; */
/* if not, or if certain other conditions apply, it uses a random */
/* move */

{
short int storedmove, randommove;
short int aval, bval, cval;

aval = thislocpattern[0];
```

```
bval = thislocpattern[1];
cval = thislocpattern[2];

storedmove =
        history[aval][bval][cval][1];

getquadran();
randommove = (quadranno + 1);

if (storedmove == 0)
        {
        currentmove = randommove;
        gotrandommove = 1;
        }
        else currentmove = storedmove;

if (repeatcount >= MAXREPEATCOUNT)
        {
        currentmove = randommove;
        gotrandommove = 1;
        } if (cyclecount >= maxnomatch)
        {
        currentmove = randommove;
        gotrandommove = 1;
        }

} void abconstack(void)

/* abconstack loads thislocpattern onto stack in the slot */
/* following stacklocation, then advances stacklocation; if this makes */
/* stacklocation equal to stackstart, stackstart is advanced */

{
int currentstackloc = stacklocation;
int currentstackstart = stackstart;
int nextstackloc, nextstackstart;

if (currentstackloc < (STACKLENGTH - 1))
        nextstackloc = (currentstackloc + 1);
        else nextstackloc = 0;

if (nextstackloc == currentstackstart)
        {
        if (currentstackstart < (STACKLENGTH - 1))
                nextstackstart = (currentstackstart + 1);
                else nextstackstart = 0;
        }
        else nextstackstart = currentstackstart;

stepstack[nextstackloc][0] = thislocpattern[0];
stepstack[nextstackloc][1] = thislocpattern[1];
stepstack[nextstackloc][2] = thislocpattern[2];

stacklocation = nextstackloc;
stackstart = nextstackstart;

} void moveintemp(void)

/* moveintemp puts currentmove into history[a][b][c][0] */

{
int aval = thislocpattern[0];
```

```c
int bval = thislocpattern[1];
int cval = thislocpattern[2];

history[aval][bval][cval][0] = currentmove;

} void learningresponse(void)

/* learningresponse goes back through the stack to LEARNINGLENGTH or until */
/* stackstart, whichever comes first; for each stack slot, it copies */
/* history[stepstack[stacklocation][a,b,c]][0] into [1], i.e. */
/* from temp into learned history */

{
int slotcount = 0;
int limitreached = 1;
int aval, bval, cval;

while ((limitreached != 0) && (slotcount < learninglength))
        {
        if (stacklocation != stackstart)
                {
                aval = stepstack[stacklocation][0];
                bval = stepstack[stacklocation][1];
                cval = stepstack[stacklocation][2];
                history[aval][bval][cval][1] =
                        history[aval][bval][cval][0];
                }
                else limitreached = 0;
        slotcount++;
        if (stacklocation > 0)
                stacklocation = (stacklocation - 1);
                else stacklocation = (STACKLENGTH - 1);
        }
} void showgameintro(void)

/* showgameintro shows an introductory text for the Game. */

{
convertarray();
guiflags[0] = guiflags[1] = guiflags[2] = guiflags[3] = 1;
showgui();
showhistorysquares();

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);
```

```c
/* display text offering option to exit introduction */
outtextxy(0, 4, "I am ready to play,");
outtextxy(0, 20, "the Game to see if");
outtextxy(0, 36, "you can find a Map");
outtextxy(0, 52, "and Pattern that");
outtextxy(0, 68, "stump me.");
outtextxy(0, 84, "");
outtextxy(0, 100, "First, you can edit");
outtextxy(0, 116, "the Map and Pattern.");
outtextxy(0, 132, "");
outtextxy(0, 148, "Then, you can select");
outtextxy(0, 164, "a Mode, set some");
outtextxy(0, 180, "parameters, and test");
outtextxy(0, 196, "your Map and Pattern.");
outtextxy(0, 212, "");
outtextxy(0, 228, "Press a key to");
outtextxy(0, 244, "continue.");
outtextxy(0, 260, "");
outtextxy(0, 276, "");
outtextxy(0, 292, "");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void showsearchintro(void)

/* showsearchintro shows an introductory text for the search. */

{
convertarray();
guiflags[0] = guiflags[1] = guiflags[2] = 1;
showgui();

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "I am ready to show");
outtextxy(0, 20, "you a search, using");
outtextxy(0, 36, "the current map, the");
outtextxy(0, 52, "current pattern, and");
```

```
outtextxy(0, 68, "current parameters,");
outtextxy(0, 84, "in Mode A. I begin");
outtextxy(0, 100, "at a random position");
outtextxy(0, 116, "and make random moves");
outtextxy(0, 132, "searching for the ");
outtextxy(0, 148, "pattern in the map.");
outtextxy(0, 164, "");
outtextxy(0, 180, "In Mode A, I show the");
outtextxy(0, 196, "map with the current");
outtextxy(0, 212, "position after every");
outtextxy(0, 228, "move; I search for");
outtextxy(0, 244, "the pattern until I");
outtextxy(0, 260, "have made Maxmoves;");
outtextxy(0, 276, "I report results");
outtextxy(0, 292, "after ten searches.");
outtextxy(0, 308, "");
outtextxy(0, 324, "Press a key to start");
outtextxy(0, 340, "a search.");
outtextxy(0, 356, "");
outtextxy(0, 372, "");
outtextxy(0, 388, "");
outtextxy(0, 404, "");

gotoxy(1, 1);

} void showlearnintro(void)

/* showlearnintro shows an introductory text for learning. */

{
convertarray();
guiflags[0] = guiflags[1] = guiflags[2] = guiflags[3] = 1;
showgui();
showhistorysquares();

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "I am ready to learn,");
outtextxy(0, 20, "using current Map,");
outtextxy(0, 36, "Pattern, Mode,");
outtextxy(0, 52, "and parameters. I");
outtextxy(0, 68, "may clear History at");
outtextxy(0, 84, "start of a session; I");
outtextxy(0, 100, "move using History");
outtextxy(0, 116, "at first; if no move");
outtextxy(0, 132, "is in History, or if");
```

```
outtextxy(0, 148, "I make Maxnomatch");
outtextxy(0, 164, "moves with no match,");
outtextxy(0, 180, "I make random moves.");
outtextxy(0, 196, "After Maxrandommoves,");
outtextxy(0, 212, "I give up and start");
outtextxy(0, 228, "another search.");
outtextxy(0, 244, "");
outtextxy(0, 260, "");
outtextxy(0, 276, "");
outtextxy(0, 292, "");
outtextxy(0, 308, "");
outtextxy(0, 324, "");
outtextxy(0, 340, "");
outtextxy(0, 356, "Press a key to start");
outtextxy(0, 372, "a session.");
outtextxy(0, 388, "");
outtextxy(0, 404, "");

gotoxy(1, 1);

} void showstartingposition(void)

/* showstartingposition obtains a converted array as the map */
/* and shows it with a text indicating that the user should */
/* press a key to start the search */

{
convertarray();
guiflags[0] = 1;
showgui();

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "Here is the starting");
outtextxy(0, 20, "position.");
outtextxy(0, 36, "");
outtextxy(0, 52, "To stop the session,");
outtextxy(0, 68, "enter X.  (exit)");
outtextxy(0, 84, "");
outtextxy(0, 100, "");
outtextxy(0, 116, "To continue, enter");
outtextxy(0, 132, "some other key.");
outtextxy(0, 148, "(not X)");
outtextxy(0, 164, "");
outtextxy(0, 180, "");
outtextxy(0, 196, "");
```

```
outtextxy(0, 212, "");
outtextxy(0, 228, "");
outtextxy(0, 244, "");
outtextxy(0, 260, "");
outtextxy(0, 276, "");
outtextxy(0, 292, "");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void showsearchresults(void)

/* showsearchresults shows a text that says how many random */
/* steps, i.e. samplecount the search took and telling the */
/* user whether it succeeded or not; this text also lets */
/* the user exit by pressing X or do another search by */
/* pressing another key */

{
char resultstring[15];
char searchnostring[6];
int averageno, thousands, hundreds, tens, ones;
int searchhundreds, searchtens, searchones;
int successes, steps;

successes = resultscount;
steps = resultsum;

averageno = (steps / successes);

thousands = (averageno / 1000);
hundreds = ((averageno - (1000 * thousands)) / 100);
tens = ((averageno - ((1000 * thousands) + (100 * hundreds)))/ 10);
ones = (averageno - ((1000 * thousands) + (100 * hundreds) +
            (10 * tens)));

searchhundreds = (successes / 100);
searchtens = ((successes - (100 * searchhundreds)) / 10);
searchones = (successes - ((100 * searchhundreds) + (10 * searchtens)));

resultstring[0] = thousands + 48;
resultstring[1] = hundreds + 48;
resultstring[2] = tens + 48;
resultstring[3] = ones + 48;
resultstring[4] = '\0';

searchnostring[0] = searchhundreds + 48;
searchnostring[1] = searchtens + 48;
searchnostring[2] = searchones + 48;
searchnostring[3] = '\0';

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));
```

```
/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "The average number");
outtextxy(0, 20, "of moves per search");
outtextxy(0, 36, "for the last group");
outtextxy(0, 52, "of searches is:");
outtextxy(0, 68, resultstring);
outtextxy(0, 84, "");
outtextxy(0, 100, "The group included");
outtextxy(0, 116, "the following number");
outtextxy(0, 132, "of searches:");
outtextxy(0, 148, searchnostring);
outtextxy(0, 164, "");
outtextxy(0, 180, "To stop searching,");
outtextxy(0, 196, "enter X (exit).");
outtextxy(0, 212, "");
outtextxy(0, 228, "To continue with");
outtextxy(0, 244, "another search,");
outtextxy(0, 260, "enter some other");
outtextxy(0, 276, "key.  (not X)");
outtextxy(0, 292, "");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void showtabularasatext(void)

/* showtabularasatext presents text indicating that history is cleared */

{
/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);
```

```
settextjustify(LEFT_TEXT, TOP_TEXT);

/* display text offering option to exit introduction */
outtextxy(0, 4, "Hey, I just forgot");
outtextxy(0, 20, "everything I knew!");
outtextxy(0, 36, "");
outtextxy(0, 52, "Back to the old");
outtextxy(0, 68, "tabula rasa.");
outtextxy(0, 84, "");
outtextxy(0, 100, "What a feeling!");
outtextxy(0, 116, "");
outtextxy(0, 132, "");
outtextxy(0, 148, "");
outtextxy(0, 164, "");
outtextxy(0, 180, "");
outtextxy(0, 196, "");
outtextxy(0, 212, "");
outtextxy(0, 228, "");
outtextxy(0, 244, "");
outtextxy(0, 260, "");
outtextxy(0, 276, "");
outtextxy(0, 292, "");
outtextxy(0, 308, "");
outtextxy(0, 324, "");
outtextxy(0, 340, "");
outtextxy(0, 356, "");
outtextxy(0, 372, "");
outtextxy(0, 388, "");
outtextxy(0, 404, "");

gotoxy(1, 1);

} void showlearnstartoptions(void)

/* showlearnstartoptions gives the user a chance to select */
/* Mode A, B, C, or D  for the learning session being started; */
/* the response starts the session   */

{
/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "I am ready to learn,");
outtextxy(0, 20, "but you may want to");
outtextxy(0, 36, "change Mode.");
outtextxy(0, 52, "In Mode A, I show");
outtextxy(0, 68, "every move.  Mode");
```

```c
outtextxy(0, 84, "A is best if you");
outtextxy(0, 100, "are beginning.");
outtextxy(0, 116, "");
outtextxy(0, 132, "In Modes B, C, and");
outtextxy(0, 148, "D, I do not show");
outtextxy(0, 164, "any moves.  Instead,");
outtextxy(0, 180, "in Mode B, I show");
outtextxy(0, 196, "results after a few");
outtextxy(0, 212, "hundred searches.");
outtextxy(0, 228, "");
outtextxy(0, 244, "In Modes C and D, I");
outtextxy(0, 260, "show results after a");
outtextxy(0, 276, "large set of searches,");
outtextxy(0, 292, "so that learning is");
outtextxy(0, 308, "completed.  If you");
outtextxy(0, 324, "are playing the Game,");
outtextxy(0, 340, "Mode D lets you edit");
outtextxy(0, 356, "Map or Pattern.");
outtextxy(0, 372, "");
outtextxy(0, 388, "Enter A, B, C, or D");
outtextxy(0, 404, "to change Mode.");

gotoxy(1, 1);

} void showlearnresults(void)

/* showlearnresults shows a text that includes the total */
/* number of learning searches, the number since the last */
/* random move, the maximum number of steps needed to find */
/* the pattern, and the average number needed */

{
char totalnostring[15], sincerandomnostring[15],
        maxnostring[15], averagenostring[15];
int totalno, sincerandomno, maxno, averageno, hundredthousands,
        tenthousands, thousands, hundreds, tens, ones;

totalno = resultlearncount;
sincerandomno = sincerandommove;
maxno = resultstepmax;
averageno = resultstepaverage;

hundredthousands = (totalno / 100000);
tenthousands = (totalno / 10000);
thousands = (totalno / 1000);
hundreds = ((totalno - (1000 * thousands)) / 100);
tens = ((totalno - ((1000 * thousands) + (100 * hundreds)))/ 10);
ones = (totalno - ((1000 * thousands) + (100 * hundreds) +
                (10 * tens)));

totalnostring[0] = hundredthousands + 48;
totalnostring[1] = tenthousands + 48;
totalnostring[2] = thousands + 48;
totalnostring[3] = hundreds + 48;
totalnostring[4] = tens + 48;
totalnostring[5] = ones + 48;
totalnostring[6] = '\0';

hundredthousands = (sincerandomno / 100000);
tenthousands = (sincerandomno / 10000);
thousands = (sincerandomno / 1000);
hundreds = ((sincerandomno - (1000 * thousands)) / 100);
tens = ((sincerandomno - ((1000 * thousands) + (100 * hundreds)))/ 10);
ones = (sincerandomno - ((1000 * thousands) + (100 * hundreds) +
                (10 * tens)));
```

```
sincerandomnostring[0] = hundredthousands + 48;
sincerandomnostring[1] = tenthousands + 48;
sincerandomnostring[2] = thousands + 48;
sincerandomnostring[3] = hundreds + 48;
sincerandomnostring[4] = tens + 48;
sincerandomnostring[5] = ones + 48;
sincerandomnostring[6] = '\0';

thousands = (maxno / 1000);
hundreds = ((maxno - (1000 * thousands)) / 100);
tens = ((maxno - ((1000 * thousands) + (100 * hundreds)))/ 10);
ones = (maxno - ((1000 * thousands) + (100 * hundreds) +
            (10 * tens)));

maxnostring[0] = thousands + 48;
maxnostring[1] = hundreds + 48;
maxnostring[2] = tens + 48;
maxnostring[3] = ones + 48;
maxnostring[4] = '\0';

thousands = (averageno / 1000);
hundreds = ((averageno - (1000 * thousands)) / 100);
tens = ((averageno - ((1000 * thousands) + (100 * hundreds))) / 10);
ones = (averageno - ((1000 * thousands) + (100 * hundreds) +
            (10 * tens)));
if (ones < 0)
        ones = 0;
if (tens < 0)
        tens = 0;

averagenostring[0] = thousands + 48;
averagenostring[1] = hundreds + 48;
averagenostring[2] = tens + 48;
averagenostring[3] = ones + 48;
averagenostring[4] = '\0';

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "The total number of");
outtextxy(0, 20, "learning searches");
outtextxy(0, 36, "since last report");
outtextxy(0, 52, "is:");
outtextxy(0, 68, totalnostring);
outtextxy(0, 84, "");
outtextxy(0, 100, "The number of");
outtextxy(0, 116, "searches since the");
outtextxy(0, 132, "last random move is:");
```

```c
outtextxy(0, 148, sincerandomnostring);
outtextxy(0, 164, "");
outtextxy(0, 180, "The highest number");
outtextxy(0, 196, "of moves to find the");
outtextxy(0, 212, "pattern is:");
outtextxy(0, 228, maxnostring);
outtextxy(0, 244, "");
outtextxy(0, 260, "The average number");
outtextxy(0, 276, "of moves is:");
outtextxy(0, 292, averagenostring);
outtextxy(0, 308, "");
outtextxy(0, 324, "To stop learning,");
outtextxy(0, 340, "enter X (exit).");
outtextxy(0, 356, "");
outtextxy(0, 372, "To start another");
outtextxy(0, 388, "session, enter some");
outtextxy(0, 404, "other key.  (not X)");

gotoxy(1, 1);

} void showgameresults(void)

/* showgameresults shows a text that includes the total */
/* number of learning searches, the number since the last */
/* random move, the maximum number of steps needed to find */
/* the pattern, and the average number needed */

{
char totalnostring[15], sincerandomnostring[15],
        maxnostring[15], averagenostring[15];
int totalno, sincerandomno, maxno, averageno, hundredthousands,
        tenthousands, thousands, hundreds, tens, ones;

totalno = resultlearncount;
sincerandomno = sincerandommove;
maxno = resultstepmax;
averageno = resultstepaverage;

hundredthousands = (totalno / 100000);
tenthousands = (totalno / 10000);
thousands = (totalno / 1000);
hundreds = ((totalno - (1000 * thousands)) / 100);
tens = ((totalno - ((1000 * thousands) + (100 * hundreds)))/ 10);
ones = (totalno - ((1000 * thousands) + (100 * hundreds) +
                (10 * tens)));

totalnostring[0] = hundredthousands + 48;
totalnostring[1] = tenthousands + 48;
totalnostring[2] = thousands + 48;
totalnostring[3] = hundreds + 48;
totalnostring[4] = tens + 48;
totalnostring[5] = ones + 48;
totalnostring[6] = '\0';

hundredthousands = (sincerandomno / 100000);
tenthousands = (sincerandomno / 10000);
thousands = (sincerandomno / 1000);
hundreds = ((sincerandomno - (1000 * thousands)) / 100);
tens = ((sincerandomno - ((1000 * thousands) + (100 * hundreds)))/ 10);
ones = (sincerandomno - ((1000 * thousands) + (100 * hundreds) +
                (10 * tens)));

sincerandomnostring[0] = hundredthousands + 48;
sincerandomnostring[1] = tenthousands + 48;
sincerandomnostring[2] = thousands + 48;
```

```
sincerandomnostring[3] = hundreds + 48;
sincerandomnostring[4] = tens + 48;
sincerandomnostring[5] = ones + 48;
sincerandomnostring[6] = '\0';

thousands = (maxno / 1000);
hundreds = ((maxno - (1000 * thousands)) / 100);
tens = ((maxno - ((1000 * thousands) + (100 * hundreds)))/ 10);
ones = (maxno - ((1000 * thousands) + (100 * hundreds) +
             (10 * tens)));

maxnostring[0] = thousands + 48;
maxnostring[1] = hundreds + 48;
maxnostring[2] = tens + 48;
maxnostring[3] = ones + 48;
maxnostring[4] = '\0';

thousands = (averageno / 1000);
hundreds = ((averageno - (1000 * thousands)) / 100);
tens = ((averageno - ((1000 * thousands) + (100 * hundreds))) / 10);
ones = (averageno - ((1000 * thousands) + (100 * hundreds) +
             (10 * tens)));
if (ones < 0)
        ones = 0;
if (tens < 0)
        tens = 0;

averagenostring[0] = thousands + 48;
averagenostring[1] = hundreds + 48;
averagenostring[2] = tens + 48;
averagenostring[3] = ones + 48;
averagenostring[4] = '\0';

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "The total number of");
outtextxy(0, 20, "learning searches");
outtextxy(0, 36, "since last report");
outtextxy(0, 52, "is:");
outtextxy(0, 68, totalnostring);
outtextxy(0, 84, "");
outtextxy(0, 100, "The number of");
outtextxy(0, 116, "searches since the");
outtextxy(0, 132, "last random move is:");
outtextxy(0, 148, sincerandomnostring);
outtextxy(0, 164, "");
outtextxy(0, 180, "The highest number");
outtextxy(0, 196, "of moves to find the");
```

```c
outtextxy(0, 212, "pattern is:");
outtextxy(0, 228, maxnostring);
outtextxy(0, 244, "");
outtextxy(0, 260, "The average number");
outtextxy(0, 276, "of moves is:");
outtextxy(0, 292, averagenostring);
outtextxy(0, 308, "");
outtextxy(0, 324, "Enter X to exit.");
outtextxy(0, 340, "Enter T to try");
outtextxy(0, 356, "editing.");
outtextxy(0, 372, "To continue learning,");
outtextxy(0, 388, "enter another key.");
outtextxy(0, 404, "(not X or T)");

gotoxy(1, 1);

} void showmodedresults(void)

/* showmodedresults shows a text that includes the total */
/* number of learning searches, the number since the last */
/* random move, the maximum number of steps needed to find */
/* the pattern, and the average number needed */

{
char totalnostring[15], sincerandomnostring[15],
        maxnostring[15], averagenostring[15];
int totalno, sincerandomno, maxno, averageno, hundredthousands,
        tenthousands, thousands, hundreds, tens, ones;

totalno = resultlearncount;
sincerandomno = sincerandommove;
maxno = resultstepmax;
averageno = resultstepaverage;

hundredthousands = (totalno / 100000);
tenthousands = (totalno / 10000);
thousands = (totalno / 1000);
hundreds = ((totalno - (1000 * thousands)) / 100);
tens = ((totalno - ((1000 * thousands) + (100 * hundreds)))/ 10);
ones = (totalno - ((1000 * thousands) + (100 * hundreds) +
            (10 * tens)));

totalnostring[0] = hundredthousands + 48;
totalnostring[1] = tenthousands + 48;
totalnostring[2] = thousands + 48;
totalnostring[3] = hundreds + 48;
totalnostring[4] = tens + 48;
totalnostring[5] = ones + 48;
totalnostring[6] = '\0';

hundredthousands = (sincerandomno / 100000);
tenthousands = (sincerandomno / 10000);
thousands = (sincerandomno / 1000);
hundreds = ((sincerandomno - (1000 * thousands)) / 100);
tens = ((sincerandomno - ((1000 * thousands) + (100 * hundreds)))/ 10
ones = (sincerandomno - ((1000 * thousands) + (100 * hundreds) +
            (10 * tens)));

sincerandomnostring[0] = hundredthousands + 48;
sincerandomnostring[1] = tenthousands + 48;
sincerandomnostring[2] = thousands + 48;
sincerandomnostring[3] = hundreds + 48;
sincerandomnostring[4] = tens + 48;
sincerandomnostring[5] = ones + 48;
sincerandomnostring[6] = '\0';
```

```
thousands = (maxno / 1000);
hundreds = ((maxno - (1000 * thousands)) / 100);
tens = ((maxno - ((1000 * thousands) + (100 * hundreds)))/ 10);
ones = (maxno - ((1000 * thousands) + (100 * hundreds) +
                  (10 * tens)));

maxnostring[0] = thousands + 48;
maxnostring[1] = hundreds + 48;
maxnostring[2] = tens + 48;
maxnostring[3] = ones + 48;
maxnostring[4] = '\0';

thousands = (averageno / 1000);
hundreds = ((averageno - (1000 * thousands)) / 100);
tens = ((averageno - ((1000 * thousands) + (100 * hundreds))) / 10);
ones = (averageno - ((1000 * thousands) + (100 * hundreds) +
                  (10 * tens)));
if (ones < 0)
        ones = 0;
if (tens < 0)
        tens = 0;

averagenostring[0] = thousands + 48;
averagenostring[1] = hundreds + 48;
averagenostring[2] = tens + 48;
averagenostring[3] = ones + 48;
averagenostring[4] = '\0';

/* create text viewport */
setviewport(20, 40, getmaxx()-270, getmaxy()-20, CLIP_ON);

clearviewport();

setcolor(getmaxcolor());

/* select fill color */
setfillstyle(SOLID_FILL, (getmaxcolor() / 4));

/* draw a border around the viewport */
rectangle(0, 0, getmaxx() - 292, getmaxy() - 62);

/* fill in bounded region */
/* change this to polyfill when time */
floodfill(80, 80, getmaxcolor());

settextstyle(DEFAULT_FONT, HORIZ_DIR, 2);

settextjustify(LEFT_TEXT, TOP_TEXT);

/* display text offering option to exit introduction */
outtextxy(0, 4, "The total number of");
outtextxy(0, 20, "learning searches");
outtextxy(0, 36, "since last report");
outtextxy(0, 52, "is:");
outtextxy(0, 68, totalnostring);
outtextxy(0, 84, "");
outtextxy(0, 100, "The number of");
outtextxy(0, 116, "searches since the");
outtextxy(0, 132, "last random move is:");
outtextxy(0, 148, sincerandomnostring);
outtextxy(0, 164, "");
outtextxy(0, 180, "The highest number");
outtextxy(0, 196, "of moves to find the");
outtextxy(0, 212, "pattern is:");
outtextxy(0, 228, maxnostring);
outtextxy(0, 244, "");
outtextxy(0, 260, "The average number");
```

```
outtextxy(0, 276, "of moves is:");
outtextxy(0, 292, averagenostring);
outtextxy(0, 308, "");
outtextxy(0, 324, "Enter X to stop.");
outtextxy(0, 340, "Enter E to edit");
outtextxy(0, 356, "Map or Pattern.");
outtextxy(0, 372, "For another session,");
outtextxy(0, 388, "enter some other");
outtextxy(0, 404, "key.  (not X or E)");

gotoxy(1, 1);

}
```

I claim:
1. A method of operating a machine that includes:

memory for storing data;

a processor connected for accessing data stored in the memory; and parameter data stored in the memory; the parameter data including:
   number data indicating a number of iterations M, where M is two or more; and
   a generated value data item that can be accessed using data indicating one of two or more possible input values to obtain one of two or more possible generated values;

the method comprising operating the processor to perform a sequence of iterations, the processor, in performing each iteration in the sequence:
   obtaining input data for the iteration; the iteration's input data indicating one of the possible input values;
   using the iteration's input data to obtain control data for the iteration; the iteration's control data indicating one of a set of control values including a first control value and a second control value;
   if the iteration's control data indicate the first control value:
      incrementing count data indicating a number of iterations since an iteration that obtained control data indicating the second control value;
      if the incremented count data indicate a number less than M, accessing the generated value data item using the iteration's input data to obtain generated data for iteration; the iteration's generated data indicating one of the possible generated values; and
      if the incremented count data indicate a number equal to M, randomly obtaining generated data for the iteration; the iteration's generated data indicating one of the possible generated values; and
   if the iteration's control data indicate the second control value, storing generated value data in the generated value data item; the generated value data indicating the value of the generated data of a first set of at least one preceding iteration in the sequence; the generated value data being stored so that the processor can obtain data indicating the generated value of each iteration in the first set by accessing the memory using data indicating the value of the iteration's input data.

2. The method of claim 1 in which the parameter data further include a temporary data item that includes the value of the generated data of each of a second set of preceding iterations; the processor, in performing each of the second set of preceding iterations; storing parameter data indicating the value of the iteration's generated data in the temporary data item.

3. The method of claim 2 in which the temporary data item includes a stack; the values of the generated data of each of the second set of preceding iterations being stored in the stack.

4. The method of claim 1 in which the parameter data further include iteration number data that indicate a number of iterations; the number of preceding iterations in the first set being equal to the number of iterations indicated by the iteration number data.

5. An article of manufacture for use in a machine that includes:

memory for storing data;

a storage medium access device that can access data stored on a storage medium;

a processor connected to access data stored by the memory and connected to receive data from the storage medium access device;

parameter data stored in the memory; the parameter data including:
   number data indicating a number of iterations M, where M is two or more; and
   a generated value data item that can be accessed using data indicating one of two or more possible input values to obtain one of two or more possible generated values;

the article comprising:

a storage medium that can store data so that the stored data can be accessed by the storage medium access device when the article is used in the machine; and instruction data stored on the storage medium; the instruction data indicating instructions the processor can execute when the article is used in the machine;

the processor, in executing the instructions, performing a sequence of iterations; the processor, in performing each iteration:
   obtaining input data for the iteration; the iteration's input data indicating one of the possible input values;
   using the iteration's input data to obtain control data for the iteration; the iteration's control data indicating one of a set of control values including a first control value and a second control value;
   if the iteration's control data indicate the first control value:
      incrementing count data indicating a number of iterations since an iteration that obtained control data indicating the second control value;
      if the incremented count data indicate a number less than M, accessing the generated value data item using the iteration's input data to obtain, generated data for the iteration; the iteration's generated data indicating one of the possible generated values; and
      if the incremented count data indicate a number equal to M, randomly obtaining generated data for the iteration; the iteration's generated data indicating one of the possible generated values; and
   if the iteration's control data indicate the second control value, storing generated value data in the generated value data item; the generated value data indicating the value of the generated data of a first set of at least one preceding iteration in the sequence; the generated value data being stored so that the processor can obtain data indicating the generated value of each iteration in the first set by accessing the memory using data indicating the value of the iteration's input data.

6. The article of claim 5, further comprising default parameter data stored on the storage medium; the processor, in executing the instructions, storing the default parameter data in the memory.

7. The article of claim 5 in which the machine further includes a user input device for providing user signals indicating user actions and an image output device for presenting images to a user in response to image output signals; the processor being connected for receiving user signals from the user input device and for providing image output signals to the image output device; the processor, in executing the instructions:

providing an image output signal to the image output device so that the image output device presents an image indicating that the user can modify the parameter data; and modifying the parameter data in response to a user signal from the user input device.

8. A machine comprising:

memory for storing data;

a processor connected to access data stored by the memory; and data stored in the memory; the stored data comprising:
 instruction data indicating instructions the processor can execute; and
 parameter data including:
  number data indicating a number of iterations M, where M is two or more; and
  a generated value data item that can be accessed using data indicating one of two or more possible input values to obtain one of two or more possible generated values;

the processor, in executing the instructions, performing a sequence of iterations; the processor, in performing each iteration:
 obtaining input data for the iteration; the iteration's input data indicating one of the possible input values;
 using the iteration's input data to obtain control data for the iteration; the iteration's control data indicating one of a set of control values including a first control value and a second control value;
 if the iteration's control data indicate the first control value:
  incrementing count data indicating a number of iterations since an iteration that obtained control data indicating the second control value;
  if the incremented count data indicate a number less than M, accessing the generated value data item using the iteration's input data to obtain generated data for the iteration; the iteration's generated data indicating one of the possible generated values; and
  if the incremented count data indicate a number equal to M, randomly obtaining generated data for the iteration; the iteration's generated data indicating one of the possible generated values; and
 if the iteration's control data indicate the second control value, storing generated value data in the generated value data item; the generated value data indicating the value of the generated data of a first set of at least one preceding iteration in the sequence: the generated value data being stored so that the processor can obtain data indicating the generated value of each iteration in the first set by accessing the memory using data indicating the value of the iteration's input data.

9. The machine of claim 8, further comprising an image output device; the processor further being connected for providing image output signals to the image output device; the processor, in performing one of the iterations, providing an image output signal so that the image output device presents an image indicating, for each of the possible input values, the possible generated value that would be obtained by accessing the generated value data item with the possible input value.

10. The machine of claim 8, further comprising a user input device for providing user signals indicating user actions; the processor being connected for receiving the user signals from the user input device; the processor, in performing one of the iterations, modifying the parameter data in response to a user signal from the user input device.

11. A method of operating a machine that includes:

memory for storing data;

a processor connected to access the data stored by the memory; and data stored by the memory; the stored data comprising:
 instruction data indicating instructions the processor can execute; and
 parameter data including:
  number data indicating a number of iterations M, where M is two or more; and
  a generated value data item that can be accessed using data indicating one of two or more possible input values to obtain one of two or more possible generated values;

the processor performing the method by executing the instructions;

the method comprising a sequence of iterations; the processor, in performing each iteration:
 obtaining input data for the iteration; the iteration's input data indicating one of the possible input values;
 using the iteration's input data to obtain control data for the iteration; the iteration's control data indicating one of a set of control values including a first control value and a second control value;
 if the iteration's control data indicate the first control value:
  incrementing count data indicating a number of iterations since an iteration that obtained control data indicating the second control value;
  if the incremented count data indicate a number less than M, accessing the generated value data item using the iteration's input data to obtain generated data for the iteration; the iteration's generated data indicating one of the possible generated values; and
  if the incremented count data indicate a number equal to M, randomly obtaining generated data for the iteration; the iteration's generated data indicating one of the possible generated values: and
 if the iteration's control data indicate the second control value, storing generated value data in the generated value data item; the generated value data indicating the value of the generated data of a first set of at least one preceding iteration in the sequence; the generated value data being stored so that the processor can obtain data indicating the generated value of each iteration in the first set by accessing the memory using data indicating the value of the iteration's input data.

12. The method of claim 11 in which the parameter data further include:

array data indicating an array of values; and position data indicating a position within the array of values;

the processor, in obtaining input data for one of the iterations, using the position data and the array data to obtain the input data.

13. The method of claim 12 in which the parameter data further include match value data indicating one of the possible input values; the processor, in using the iteration's input data to obtain control data for the iteration:

if the match value data indicate the same value as the input data, obtaining control data with the second control value; and if the match value data do not indicate the same value as the input data, obtaining control data with the first control value.

14. The method of claim 12 in which the generated value data item includes first move data indicating, for at least one of the possible input values, a first move value that is one of two or more possible move values, each move value indicating a way of changing position within the array of values; each of the possible generated values being one of the possible move values.

15. The method of claim 14 in which the processor, in accessing the generated value data item using the iteration's input data to obtain generated data for the iteration, uses the iteration's input data to access the first move data.

16. The method of claim 14 in which the parameter data further include second move data indicating, for a preceding iteration, a second move value that is the value of the preceding iteration's generated data; the processor, in performing the preceding iteration, storing the second move data.

17. The method of claim 16 in which the processor, in storing generated value data in the generated value data item in an iteration subsequent to the preceding iteration, uses the second move data to obtain the generated value data.

18. The method of claim 14 in which the processor, in using the iteration's input data to obtain generated data for the iteration:

uses the iteration's input data to access the first move data; and if a value is obtained from the first move data that is not one of the possible generated values, randomly obtains generated data indicating one of the possible generated values.

19. The method of claim 14 in which the machine further includes an image output device for presenting images to a user; the processor being connected for providing image output signals to the image output device; the processor, in performing one of the iterations, providing an image output signal so that the image output device presents an image indicating the first move data.

20. The method of claim 13 in which the machine further includes an image output device for presenting images to a user; the processor being connected for providing image output signals to the image output device; the machine further including a user input device for providing user signals indicating user actions; the processor being connected for receiving the user signals from the user input device; the processor further, in executing the instructions:

providing an image output signal to the image output device so that the image output device presents an image indicating the match value data; and modifying the match value data in response to a user signal from the user input device.

21. The method of claim 12 in which the machine further includes an image output device for presenting images to a user; the processor being connected for providing image output signals to the image output device; the machine further including a user input device for providing user signals indicating user actions; the processor being connected for receiving the user signals from the user input device; the processor further, in executing the instructions:

providing an image output signal to the image output device so that the image output device presents an image indicating the array data; and modifying the array data in response to a user signal from the user input device.

22. The method of claim 11 in which the parameter data further include random number data indicating a number of iterations N; the processor, in performing each iteration after an iteration in which the first count data indicate a number equal to M, if the iteration's control data continue to indicate the first control value:

incrementing second count data indicating a number of iterations since the iteration in which the first count data indicated a number equal to M; and if the second count data indicates a number less than N, randomly obtaining generated data indicating one of the possible generated values.

23. A method of operating a machine that includes:

memory for storing data;

a processor connected for accessing data stored in the memory; and parameter data stored in the memory; the parameter data indicating:

an array of values;

for each of two or more possible input values, one of a set of two or more possible move values; at least two of the set of possible move values each indicating a change of position within the array of values; and a first number of iterations M, where M is two or more;

the method comprising:

operating the processor to obtain an initial starting position within the array of values;

operating the processor to perform a sequence of iterations; the sequence including a first iteration and at least one following iteration, each following iteration having an immediately preceding iteration in the sequence; each iteration in the sequence having a starting position and an ending position; the first iteration's starting position being the initial starting position; the starting position of each following iteration being the ending position of the immediately preceding iteration; each starting position and each ending position including two or more values in the array; the processor, in performing each iteration in the sequence:

obtaining input data indicating one of the possible input values based on the values in the iteration's starting position within the array of values;

using the input data to obtain control data; the control data indicating one of a set of control values; the set of control values including a first control value and a second control value;

if the control data indicate the first control value:

incrementing first count data indicating a number of iterations since an iteration in which the control data indicated the second control value;

obtaining move data indicating one of the set of possible move values that indicates a change of position within the array of values; the move data indicating a change of position from the iteration's starting position to the iteration's ending position within the array of values; the processor, in obtaining move data:

if the incremented first count data indicate a number less than M, using the input data to obtain move data indicating the possible move value for the input value indicated by the input data; and if the incremented first count data indicate a number equal to M, randomly obtaining move data indicating one of the possible move values that indicates a change of position; and using the move data to obtain the iteration's ending position; and if the control data indicate the second control value, updating the parameter data to indicate the value of the move data of each of a set of at least one preceding iteration in the sequence so that the processor can use data indicating the input value indicated by the input data of each preceding iteration in the set to obtain move data indicating the possible move value obtained by the preceding iteration.

24. The method of claim 23 in which the parameter data further indicate a match value that is one of the possilbe input values;

the processor, in using the input value to obtain control data:

if the input data indicate the match value, obtaining control data indicating the second control value; and if the input data do not indicate the match value, obtaining control data indicating the first control value.

25. A machine-implemented method comprising:

storing first parameter data indicating a first number of iterations M and second parameter data indicating a second number of iterations N, where M and N are each two or more;

a first sequence of iterations, each iteration in the first sequence comprising:

obtaining input data indicating one of two or more possible input values;

using the input data to obtain control data; the control data indicating one of a set of control values; the set of control values including a first control value and a second control value;

if the control data indicate the first control value:

incrementing first count data indicating a number of iterations since an iteration in which the control data indicated the second control value;

if the first count data indicate a number less than M, using the input data to obtain generated data indicating one of two or more possible generated values; and if the first count data indicate a number equal to M, randomly obtaining generated data indicating one of the possible generated values and ending the first sequence of iterations;

if the control data indicates the second control value, storing generated value data indicating the value of the generated data of at least one preceding iteration in the first sequence so that the stored generated value data for each preceding iteration can be accessed using data indicating the value of the preceding iteration's input data and ending the first sequence of iterations; and if the first sequence of iterations ends before the control data indicate the second control value, a second sequence of iterations, each iteration in the second sequence comprising:

obtaining input data indicating one of the possible input values;

using the input data to obtain control data; the control data indicating one of a set of control values; the set of control values including a first control value and a second control value;

if the control data indicate the first control value:

incrementing second count data indicating a number of iterations since the second sequence began;

randomly obtaining generated data indicating one of the possible generated values; and if the second count data indicate N iterations, ending the second sequence of iterations; and if the control data indicate the second control value, storing generated value data indicating the value of the generated data of at least one preceding iteration in the sequence so that the stored generated value data for each preceding iteration can be accessed using data indicating the value of the preceding iteration's input data.

* * * * *